(12) United States Patent
Aoki et al.

(10) Patent No.: US 11,247,533 B2
(45) Date of Patent: Feb. 15, 2022

(54) VEHICULAR AIR CONDITIONING DEVICE

(71) Applicant: SANDEN AUTOMOTIVE CLIMATE SYSTEMS CORPORATION, Isesaki (JP)

(72) Inventors: Takafumi Aoki, Isesaki (JP); Ryo Miyakoshi, Isesaki (JP); Kouhei Yamashita, Isesaki (JP)

(73) Assignee: Sanden Automotive Climate Systems Corporation, Isesaki (JP)

( * ) Notice: Subject to any disclaimer, the term of this patent is extended or adjusted under 35 U.S.C. 154(b) by 391 days.

(21) Appl. No.: 16/334,628

(22) PCT Filed: Sep. 7, 2017

(86) PCT No.: PCT/JP2017/033172
§ 371 (c)(1),
(2) Date: Mar. 19, 2019

(87) PCT Pub. No.: WO2018/074112
PCT Pub. Date: Apr. 26, 2018

(65) Prior Publication Data
US 2020/0180401 A1  Jun. 11, 2020

(30) Foreign Application Priority Data

Oct. 20, 2016  (JP) .............................. JP2016-205910

(51) Int. Cl.
*B60H 1/03* (2006.01)
*B60H 1/00* (2006.01)
*B60H 1/32* (2006.01)

(52) U.S. Cl.
CPC ........... *B60H 1/03* (2013.01); *B60H 1/00007* (2013.01); *B60H 1/00428* (2013.01); *B60H 1/00899* (2013.01); *B60H 1/3213* (2013.01)

(58) Field of Classification Search
CPC .. B60H 1/03; B60H 1/00007; B60H 1/00428; B60H 1/00899; B60H 1/3213;
(Continued)

(56) References Cited

U.S. PATENT DOCUMENTS

| 5,983,989 A * | 11/1999 | Kimishima ........ B60H 1/00735 165/43 |
|---|---|---|
| 9,944,256 B2 * | 4/2018 | Miyakoshi ............ F25B 47/006 |
| 2015/0283978 A1 | 10/2015 | Miyakoshi et al. | |

FOREIGN PATENT DOCUMENTS

| CN | 104822551 A | 8/2015 | |
|---|---|---|---|
| EP | 1362725 A2 * | 11/2003 | ......... B60H 1/00735 |

(Continued)

OTHER PUBLICATIONS

Japan Patent Office, International Search Report issued in International Application No. PCT/JP2017/033172, dated Dec. 12, 2017.
(Continued)

*Primary Examiner* — Eric S Ruppert
(74) *Attorney, Agent, or Firm* — Baker Botts L.L.P.

(57) ABSTRACT

A heating temperature is appropriately estimated according to an operation mode to achieve comfortable vehicle interior air conditioning. A vehicular air conditioning device 1 includes a compressor 2, an air flow passage 3, a radiator 4 for heating air to be supplied to a vehicle interior, a heat absorber 9 for cooling the air to be supplied to the vehicle interior, and a heat pump controller. The heat pump controller calculates a heating temperature TH being the temperature of air on a leeward side of the radiator and use the heating temperature in control, and calculates the heating temperature TH using an estimation formula which differs depending on the operation mode.

18 Claims, 9 Drawing Sheets

(58) Field of Classification Search
CPC ........ B60H 2001/224; B60H 2001/225; B60H 2001/2265; B60H 1/0073; B60H 1/2218; B60H 2001/00957; B60H 1/00921; F25B 41/20; F25B 1/00
See application file for complete search history.

(56) References Cited

FOREIGN PATENT DOCUMENTS

| | | |
|---|---|---|
| JP | 10-297253 A | 11/1998 |
| JP | 2000-052740 A | 2/2000 |
| JP | 2012-250708 A | 12/2012 |
| TW | 389821 B | 5/2000 |
| WO | 2012/108240 A1 | 8/2012 |

OTHER PUBLICATIONS

The State Intellectual Property Office of the People's Republic of China, The First Office Action issued in Chinese Patent Application No. 201780057291.X dated Aug. 18, 2021.

* cited by examiner

FIG. 8

| TIME CONSTANT MAP | | TARGET MODE |
|---|---|---|
| Ga | Tau0 | - WHEN HP AND PTC ARE AT STOP<br>- PTC SINGLE OPERATION |
| 0 | 10 | |
| 80 | 10 | |
| 200 | 10 | |
| 300 | 10 | |
| 400 | 10 | |
| 500 | 10 | |
| Ga | Tau1 | - HEATING |
| 0 | 15 | |
| 80 | 15 | |
| 200 | 15 | |
| 300 | 15 | |
| 400 | 15 | |
| 500 | 15 | |
| Ga | Tau2 | - DEHUMIDIFYING AND HEATING<br>- WHEN CHANGING FROM DEHUMIDIFYING AND HEATING TO HEATING<br>- WHEN COMPRESSOR IS IN STARTUP |
| 0 | 20 | |
| 80 | 20 | |
| 200 | 20 | |
| 300 | 20 | |
| 400 | 20 | |
| 500 | 20 | |
| Ga | Tau3 | - COOLING<br>- MAX COOLING<br>- DEHUMIDIFYING AND COOLING |
| 0 | 40 | |
| 80 | 40 | |
| 200 | 40 | |
| 300 | 30 | |
| 400 | 20 | |
| 500 | 10 | |

VEHICULAR AIR CONDITIONING DEVICE

CROSS-REFERENCE TO RELATED APPLICATIONS

This application is a U.S. National Stage Patent Application under 35 U.S.C. § 371 of International Patent Application No. PCT/JP2017/033172, filed on Sep. 7, 2017, which claims the benefit of Japanese Patent Application No. JP 2016-205910, filed on Oct. 20, 2016, the disclosures of each of which are incorporated herein by reference in their entirety.

TECHNICAL FIELD

The present invention relates to an air conditioning device of a heat pump system which conditions air of a vehicle interior of a vehicle.

BACKGROUND ART

Due to actualization of environmental problems in recent years, hybrid cars and electric vehicles have spread. Then, as an air conditioning device which is applicable to such a vehicle, there has been developed one which includes an electric compressor to compress and discharge a refrigerant, a radiator (condenser) provided within an air flow passage to let the refrigerant radiate heat, a heat absorber (evaporator) provided within the air flow passage to let the refrigerant absorb heat, and an outdoor heat exchanger provided outside a vehicle interior to let the refrigerant radiate heat or absorb heat, and which changes and executes respective operation modes such as a heating mode to let the refrigerant discharged from the compressor radiate heat in the radiator and let the refrigerant from which the heat has been radiated in this radiator absorb heat in the outdoor heat exchanger, a dehumidifying and heating mode to let the refrigerant discharged from the compressor radiate heat in the radiator and let the refrigerant from which the heat has been radiated absorb heat in the heat absorber and the outdoor heat exchanger, a dehumidifying and cooling mode to let the refrigerant discharged from the compressor radiate heat in the radiator and the outdoor heat exchanger and let the heat-radiated refrigerant absorb heat in the heat absorber, a cooling mode to let the refrigerant discharged from the compressor radiate heat in the outdoor heat exchanger and let the refrigerant absorb heat in the heat absorber, etc.

Then, an air mix damper is provided in the air flow passage, and the ratio of air to be passed through the radiator is adjusted from zero in a whole range by the air mix damper, whereby a target outlet temperature to a vehicle interior has been achieved (e.g., see Patent Document 1).

In this case, the interior of the air flow passage on the leeward side of the heat absorber is partitioned into a heating heat exchange passage and a bypass passage, and the radiator is disposed in the heating heat exchange passage. Then, the air volume of the air to be passed through the heating heat exchange passage is adjusted by the air mix damper, but a parameter called an air volume ratio SW at which the air is to be passed through the heating heat exchange passage (radiator), which is obtained from a calculation formula of SW=(TAO−Te)/(TH−Te) is used for control of the air mix damper in this case.

In this case, TAO is a target outlet temperature, TH is a temperature (a heating temperature TH to be described later) of the air on the leeward side of the radiator, Te is a temperature of the heat absorber, and the air volume ratio SW is calculated within 0≤SW≤1. There are shown at "0", an air mix fully-closed state in which the air is not passed through the heating heat exchange passage (radiator), and at"1", an air mix fully-opened state in which all the air in the air flow passage is passed through the heating heat exchange passage (radiator). Further, the above heating temperature TH has been used even for changing of each operation mode.

CITATION LIST

Patent Documents

Patent Document 1: Japanese Patent Application Publication No. 2012-250708

SUMMARY OF THE INVENTION

Problems to be Solved by the Invention

Here, the heating temperature TH that is the temperature of the air on the downstream side of the above-described radiator has heretofore been estimated by a predetermined estimation formula without using a temperature sensor. A problem however arises in that since in the related art, a fixed estimation formula is set, and a heating temperature TH has been calculated using this estimation formula even in any operation mode, a difference becomes large between the estimated heating temperature TH and an actual temperature of the air on the downstream side of the radiator, thereby causing adverse effects to the temperature of the air blown out to the vehicle interior.

The present invention has been developed to solve such conventional technical problems, and an object thereof is to appropriately estimate a heating temperature according to an operation mode and achieve comfortable vehicle interior air conditioning in a vehicular air conditioning device of a so-called heat pump system.

Means for Solving the Problems

A vehicular air conditioning device of the present invention includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, and a control device, whereby the control device changes and executes a plurality of operation modes to condition the air of the vehicle interior. The vehicular air conditioning device is characterized in that the control device calculates a heating temperature TH being a temperature of the air on a leeward side of the radiator and uses the heating temperature TH in control, and calculates the heating temperature TH using an estimation formula which differs depending on the operation mode.

The vehicular air conditioning device of the invention of claim 2 is characterized in that in the above invention, the control device uses the heating temperature TH for calculation of an air volume ratio SW at which the air is to be passed through the radiator, and/or for changing of the operation modes.

The vehicular air conditioning device of the invention of claim 3 is characterized in that in the above respective inventions, the control device performs a calculation of a first-order lag of a time constant Tau different depending on the operation mode to calculate the heating temperature TH.

The vehicular air conditioning device of the invention of claim 4 is characterized in that in the above invention, the control device changes the time constant Tau of the first-order lag according to a volumetric air volume Ga of the air flowing into the air flow passage.

The vehicular air conditioning device of the invention of claim 5 is characterized in that in the invention of claim 3 or 4, the control device calculates the heating temperature TH on the basis of a steady-state value TH0 being a value of the heating temperature TH in a steady state, and the time constant Tau of the first-order lag.

The vehicular air conditioning device of the invention of claim 6 is characterized in that in the above invention, the vehicular air conditioning device includes an outdoor heat exchanger provided outside the vehicle interior, and in that the control device has a dehumidifying and cooling mode to let the refrigerant discharged from the compressor flow from the radiator to the outdoor heat exchanger, let the refrigerant radiate heat in the radiator and the outdoor heat exchanger, decompress the refrigerant heat-radiated, and then let the refrigerant absorb heat in the heat absorber, and in in the dehumidifying and cooling mode, the control device determines the steady-state value TH0 on the basis of a saturation temperature THsatu of the refrigerant obtained from a refrigerant pressure of the radiator.

The vehicular air conditioning device of the invention of claim 7 is characterized in that in the invention of claim 5 or 6, the vehicular air conditioning device includes an outdoor heat exchanger provided outside the vehicle interior, and in that the control device has a cooling mode to let the refrigerant discharged from the compressor flow from the radiator to the outdoor heat exchanger, let the refrigerant radiate heat in the outdoor heat exchanger, decompress the refrigerant heat-radiated, and then let the refrigerant absorb heat in the heat absorber, and in the cooling mode, the control device determines the steady-state value TH0 on the basis of an average value of refrigerant temperatures of an inlet and an outlet of the radiator.

The vehicular air conditioning device of the invention of claim 8 is characterized in that in the inventions of claims 5 through 7, the vehicular air conditioning device includes a bypass device to let the refrigerant discharged from the compressor flow directly into the outdoor heat exchanger without flowing to the radiator, and in that the control device has a maximum cooling mode to let the refrigerant discharged from the compressor flow into the outdoor heat exchanger by the bypass device and radiate heat therein, decompress the refrigerant heat-radiated, and then let the refrigerant absorb heat in the heat absorber, and in the maximum cooling mode, the control device determines the steady-state value TH0 on the basis of the average value of the refrigerant temperatures of the inlet and outlet of the radiator.

The vehicular air conditioning device of the invention of claim 9 is characterized in that in the inventions of claims 5 through 8, the control device has a heating mode to let the refrigerant discharged from the compressor flow into the radiator and radiate heat therein, decompress the refrigerant heat-radiated, and then let the refrigerant absorb heat in the outdoor heat exchanger, and in the heating mode, the control device corrects the saturation temperature THsatu of the refrigerant obtained from the refrigerant pressure of the radiator with a predetermined correction value to determine the steady-stage value TH0, and determines the correction value from a subcool degree SC of the refrigerant in the radiator and the volumetric air volume Ga of the air flowing into the air flow passage, or the volumetric air volume Ga and an air volume ratio SW at which the air is to be passed through the radiator.

The vehicular air conditioning device of the invention of claim 10 is characterized in that in the inventions or claims 5 through 9, the vehicular air conditioning device includes a bypass device to let the refrigerant discharged from the compressor flow directly into the outdoor heat exchanger without flowing to the radiator, and an auxiliary heating device to let the air to be supplied from the air flow passage to the vehicle interior heat, and in that the control device executes a dehumidifying and heating mode to let the refrigerant discharged from the compressor flow into the outdoor heat exchanger by the bypass device and radiate heat therein, decompress the refrigerant heat-radiated, then let the refrigerant absorb heat in the heat absorber, and let the auxiliary heating device generate heat, and in the dehumidifying and heating mode, the control device determines the steady-state value TH0 on the basis of a temperature Tptc of the auxiliary heating device.

The vehicular air conditioning device of the invention of claim 11 is characterized in that in the inventions of claims 5 through 9, the control device has a dehumidifying and heating mode to let the refrigerant discharged from the compressor radiate heat in the radiator, decompress the refrigerant head-radiated, and then let the refrigerant absorb heat only in the heat absorber, or in the heat absorber and the outdoor heat exchanger, and in the dehumidifying and heating mode, the control device determines the steady-state value TH0 on the basis of the saturation temperature THsatu of the refrigerant obtained from the refrigerant pressure of the radiator.

The vehicular air conditioning device of the invention of claim 12 is characterized in that in the inventions of claims 5 through 11, the control device determines the steady-stage value TH0 on the basis of the saturation temperature THsatu of the refrigerant obtained from the refrigerant pressure of the radiator during an operation stop, or the average value of the refrigerant temperatures of the inlet and outlet of the radiator.

Advantageous Effect of the Invention

According to the present invention, in a vehicular air conditioning device which includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, and a control device, whereby the control device changes and executes a plurality of operation modes to condition the air of the vehicle interior, the control device calculates a heating temperature TH being a temperature of the air on a leeward side of the radiator and uses the heating temperature TH in control, and calculates the heating temperature TH using an estimation formula which differs depending on the operation mode. It is therefore possible to appropriately estimate the heating temperature TH according to the operation mode without using a special temperature sensor and use the heating temperature in control.

That is, for example, as in the invention of claim 2, when the control device uses the estimated heating temperature TH upon calculation of an air volume ratio SW at which the air is to be passed through the radiator, and/or upon changing of the operation modes, the control device minimizes a difference between the heating temperature and an actual temperature of the air on the leeward side of the radiator, and adequately controls the temperature of the air blown out to the vehicle interior, thereby making it possible to achieve comfortable vehicle interior air conditioning.

Here, even if the operation mode is changed over, the actual temperature of the air on the leeward side of the radiator does not change immediately. Thus, as in the invention of claim 3, when the control device performs a calculation of a first-order lag of a time constant Tau different depending on the operation mode to thereby calculate the heating temperature TH, the heating temperature TH can be estimated so as to match with the actual temperature change of the air on the leeward side of the radiator.

Also, the actual temperature change of the air on the leeward side of the radiator differs even depending on the amount of the air flowing through the air flow passage. Thus, as in the invention of claim 4, when the control device changes the time constant Tau of the first-order lag according to a volumetric air volume Ga of the air flowing into the air flow passage, it is possible to change a response speed in consideration of the volumetric air volume in the air flow passage and estimate an appropriate heating temperature TH.

Further, as in the invention of claim 5 in this case, when the control device calculates the heating temperature TH on the basis of a steady-state value TH0 being a value of the heating temperature TH in a steady state, and the time constant Tau of the first-order lag, it is possible to estimate a heating temperature TH at which an actual temperature change from the steady-state value TH0 is assumed.

For example, as in the invention of claim 6, when an outdoor heat exchanger provided outside the vehicle interior is further included, and the control device has a dehumidifying and cooling mode to let the refrigerant discharged from the compressor flow from the radiator to the outdoor heat exchanger, let the refrigerant radiate heat in the radiator and the outdoor heat exchanger, decompress the refrigerant heat-radiated, and then let the refrigerant absorb heat in the heat absorber, a heating temperature TH can be appropriately estimated from an average temperature of the radiator having considered a subcool degree of the refrigerant in the radiator by determining in the dehumidifying and cooling mode, the steady-state value TH0 on the basis of a saturation temperature THsatu of the refrigerant obtained from a refrigerant pressure of the radiator.

Additionally, as in the invention of claim 7, when an outdoor heat exchanger provided outside the vehicle interior is further included, and the control device has a cooling mode to let the refrigerant discharged from the compressor flow from the radiator to the outdoor heat exchanger, let the refrigerant radiate heat in the outdoor heat exchanger, decompress the refrigerant heat-radiated, and then let the refrigerant absorb heat in the heat absorber, the steady-state value TH0 is determined on the basis of an average value of refrigerant temperatures of an inlet and an outlet of the radiator in the cooling mode. Consequently, since the subcool degree is not applied to the refrigerant in the radiator in the cooling mode, a heating temperature TH can be appropriately estimated only by determining an average temperature of the radiator from then average value of the refrigerant temperatures of the inlet and the outlet.

Furthermore, as in the invention of claim 8, when a bypass device to let the refrigerant discharged from the compressor flow directly into the outdoor heat exchanger without flowing to the radiator is further provided, and the control device has a maximum cooling mode to let the refrigerant discharged from the compressor flow into the outdoor heat exchanger by the bypass device and radiate heat therein, decompress the refrigerant heat-radiated, and then let the refrigerant absorb heat in the heat absorber, a heating temperature TH can similarly be estimated appropriately by determining the steady-state value TH0 on the basis of the average value of the refrigerant temperatures of the inlet and outlet of the radiator even in the maximum cooling mode.

Additionally, as in the invention of claim 9, when the control device has a heating mode to let the refrigerant discharged from the compressor flow into the radiator and radiate heat therein, decompress the refrigerant heat-radiated, and then let the refrigerant absorb heat in the outdoor heat exchanger, a heating temperature TH can be estimated from an average temperature of the radiator having considered a subcool degree of the refrigerant in the radiator by determining the steady-state value TH0 on the basis of the saturation temperature THsatu of the refrigerant obtained from the refrigerant pressure of the radiator even in the heating mode. In this case, since the saturation temperature THsatu also changes depending on the subcool degree SC of the refrigerant in the radiator, the volumetric air volume Ga of the air flowing into the air flow passage, and the air volume ratio SW at which the air is to be passed through the radiator, particularly in the heating mode, the heating temperature TH can be estimated more appropriately by determining a correction value from these to correct the saturation temperature THsatu.

Furthermore, as in the invention of claim 10, when a bypass device to let the refrigerant discharged from the compressor flow directly into the outdoor heat exchanger without flowing to the radiator, and an auxiliary heating device to let the air to be supplied from the air flow passage to the vehicle interior heat are further provided, and the control device has a dehumidifying and heating mode to let the refrigerant discharged from the compressor flow into the outdoor heat exchanger by the bypass device and radiate heat therein, decompress the refrigerant heat-radiated, then let the refrigerant absorb heat in the heat absorber, and let the auxiliary heating device generate heat, a heating temperature TH being a temperature of the air on a leeward side of the radiator can be appropriately estimated by determining the steady-state value TH0 on the basis of a temperature Tptc of the auxiliary heating device in the dehumidifying and heating mode.

Besides, as in the invention of claim 11, when the control device has a dehumidifying and heating mode to let the refrigerant discharged from the compressor radiate heat in the radiator, decompress the refrigerant head-radiated, and then let the refrigerant absorb heat only in the heat absorber, or in the heat absorber and the outdoor heat exchanger, a heating temperature TH can be appropriately estimated from an average temperature of the radiator having considered a subcool degree of the refrigerant in the radiator by determining the steady-state value TH0 on the basis of the saturation temperature THsatu of the refrigerant obtained from the refrigerant pressure of the radiator in the dehumidifying and heating mode.

Then, the control device of the invention of claim 12 determines the steady-stage value TH0 on the basis of the saturation temperature THsatu of the refrigerant obtained from the refrigerant pressure of the radiator, or the average value of the refrigerant temperatures of the inlet and outlet of the radiator during an operation stop, thereby making it possible to smoothly resume control using a heating temperature TH when the operation is next started.

BRIEF DESCRIPTION OF THE DRAWINGS

FIG. 8 is a diagram illustrating a change map of a time constant Tau corresponding to a volumetric air volume Ga;

MODE FOR CARRYING OUT THE INVENTION

Hereinafter, description will be made as to embodiments of the present invention in detail with reference to the drawings.

Embodiment 1

Figure 1:
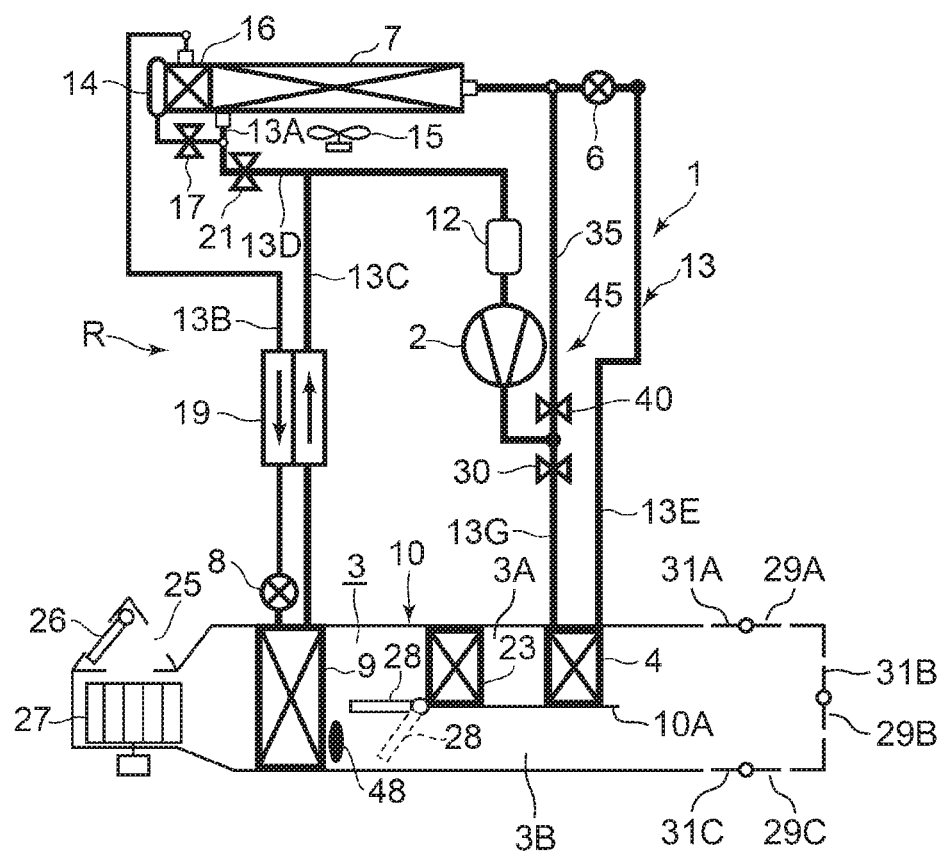
FIG. 1 is a constitutional view of a vehicular air conditioning device of an embodiment to which the present invention is applied (embodiment 1)

FIG. 1 shows a constitutional view of a vehicular air conditioning device 1 of an embodiment of the present invention. A vehicle of the embodiment to which the present invention is applied is an electric vehicle (EV) in which an engine (an internal combustion engine) is not mounted, and runs with an electric motor for running which is driven by power charged in a battery (both being not shown in the drawing), and the vehicular air conditioning device 1 of the present invention is also driven by the power of the battery. That is, in the electric vehicle which is not capable of performing heating by engine waste heat, the vehicular air conditioning device 1 of the embodiment performs a heating mode by a heat pump operation in which a refrigerant circuit is used. Further, the vehicular air conditioning device 1 selectively executes respective operation modes of a dehumidifying and heating mode, a dehumidifying and cooling mode, a cooling mode, a MAX cooling mode (maximum cooling mode), and an auxiliary heater single mode.

Incidentally, the vehicle is not limited to the electric vehicle, and the present invention is also effective for a so-called hybrid car in which the engine is used together with the electric motor for running. Further, it is needless to say that the present invention is also applicable to a usual car which runs with the engine.

The vehicular air conditioning device 1 of the embodiment performs air conditioning (heating, cooling, dehumidifying, and ventilation) of a vehicle interior of the electric vehicle. An electric type of compressor 2 to compress a refrigerant, a radiator 4 as a heater provided in an air flow passage 3 of an HVAC unit 10 in which vehicle interior air is ventilated and circulated, to let the high-temperature high-pressure refrigerant discharged from the compressor 2 flow therein via a refrigerant pipe 13G and to let the refrigerant radiate heat to heat air supplied to the vehicle interior, an outdoor expansion valve 6 (a pressure reducing unit) constituted of an electric valve which decompresses and expands the refrigerant during the heating, an outdoor heat exchanger 7 which is provided outside the vehicle interior and which performs heat exchange between the refrigerant and outdoor air to function as the radiator during the cooling and to function as an evaporator during the heating, an indoor expansion valve 8 (a pressure reducing unit) constituted of an electric valve to decompress and expand the refrigerant, a heat absorber 9 provided in the air flow passage 3 to let the refrigerant absorb heat during the cooling and dehumidifying to cool air sucked from interior and exterior of the vehicle and supplied to the vehicle interior, an accumulator 12, and others are successively connected by a refrigerant pipe 13, whereby a refrigerant circuit R is constituted.

Then, the refrigerant circuit R is filled with a predetermined amount of refrigerant and oil for lubrication. Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h).

Further, the outdoor heat exchanger 7 has a receiver drier portion 14 and a subcooling portion 16 successively on a refrigerant downstream side. A refrigerant pipe 13A extending out from the outdoor heat exchanger 7 is connected to the receiver drier portion 14 via a solenoid valve 17 to be opened during the cooling. A refrigerant pipe 13B on an outlet side of the subcooling portion 16 is connected to an inlet side of the heat absorber 9 via the indoor expansion valve 8. Incidentally, the receiver drier portion 14 and the subcooling portion 16 structurally constitute a part of the outdoor heat exchanger 7.

Additionally, a refrigerant pipe 13B between the subcooling portion 16 and the indoor expansion valve 8 is provided in a heat exchange relation with a refrigerant pipe 13C on an outlet side of the heat absorber 9, and both the pipes constitute an internal heat exchanger 19. Consequently, the refrigerant flowing into the indoor expansion valve 8 through the refrigerant pipe 13B is made to be cooled (subcooled) by the low-temperature refrigerant flowing out from the heat absorber 9.

In addition, the refrigerant pipe 13A extending out from the outdoor heat exchanger 7 branches to a refrigerant pipe 13D, and this branching refrigerant pipe 13D communicates and connects with the refrigerant pipe 13C on a downstream side of the internal heat exchanger 19 via a solenoid valve 21 to be opened during the heating. The refrigerant pipe 13C is connected to the accumulator 12, and the accumulator 12 is connected to a refrigerant suction side of the compressor 2. Further, a refrigerant pipe 13E on an outlet side of the radiator 4 is connected to an inlet side of the outdoor heat exchanger 7 via the outdoor expansion valve 6.

Furthermore, a solenoid valve 30 (constituting a flow passage changing device) to be closed during dehumidifying and heating and MAX cooling to be described later is interposed in the refrigerant pipe 13G between a discharge side of the compressor 2 and an inlet side of the radiator 4. In this case, the refrigerant pipe 13G branches to a bypass pipe 35 on an upstream side of the solenoid valve 30. This bypass pipe 35 communicates and connects with the refrigerant pipe 13E on a downstream side of the outdoor expansion valve 6 via a solenoid valve 40 (also constituting a flow passage changing device) to be opened during the dehumidifying and heating and the MAX cooling. A bypass device 45 is constituted of these bypass pipe 35, solenoid valve 30 and solenoid valve 40.

The bypass device 45 is constituted of such a bypass pipe 35, a solenoid valve 30 and a solenoid valve 40 to thereby make it possible to smoothly perform changing of the dehumidifying and heating mode and the MAX cooling mode to allow the refrigerant discharged from the compressor 2 to directly flow in the outdoor heat exchanger 7, and the heating mode, the dehumidifying and cooling mode and the cooling mode to allow the refrigerant discharged from the compressor 2 to flow in the radiator 4, as will be described later.

Additionally, in the air flow passage 3 on an air upstream side of the heat absorber 9, respective suction ports such as an outdoor air suction port and an indoor air suction port are formed (shown as a representative by a suction port 25 in FIG. 1). There is provided in the suction port 25, a suction changing damper 26 to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 for supplying the introduced indoor or outdoor air to the air flow passage 3 is provided.

Furthermore, in FIG. 1, 23 denotes an auxiliary heater as an auxiliary heating device (another heater) provided in the vehicular air conditioning device 1 of the embodiment. The auxiliary heater 23 of the embodiment is constituted of a PTC heater being an electric heater, and provided in the air flow passage 3 on a windward side (an air upstream side) of the radiator 4 to the flow of the air in the air flow passage 3. Then, when the auxiliary heater 23 is energized to generate heat, the air in the air flow passage 3, which flows into the radiator 4 via the heat absorber 9 is heated. That is, the auxiliary heater 23 becomes a so-called heater core to perform heating of the vehicle interior or complement it. In the embodiment, the aforementioned radiator 4 and this auxiliary heater 23 become heaters.

Here, the air flow passage 3 on a leeward side (an air downstream side) more than the heat absorber 9 of the HVAC unit 10 is partitioned by a partition wall 10A to form a heating heat exchange passage 3A and a bypass passage 3B to bypass it. The aforementioned radiator 4 and auxiliary heater 23 are disposed in the heating heat exchange passage 3A.

Additionally, in the air flow passage 3 on a leeward side of the auxiliary heater 23, an air mix damper 28 is provided to adjust a ratio at which the air (the indoor air or outdoor air) in the air flow passage 3 flowing into the air flow passage 3 and passed through the heat absorber 9 is to be passed through the heating heat exchange passage 3A in which the auxiliary heater 23 and the radiator 4 are disposed.

Furthermore, the HVAC unit 10 on a leeward side of the radiator 4 is formed with respective outlets of a FOOT (foot) outlet 29A (first outlet), a VENT (vent) outlet 29B (a second outlet with respect to the FOOT outlet 29A and a first outlet with respect to a DEF outlet 29C), the DEF (def) outlet 29C (a second outlet). The FOOT outlet 29A is an outlet to blow out the air to the foot of the vehicle interior and is located at the lowest position. Further, the VENT outlet 29B is an outlet to blow out the air to the proximity of the breast or face of a driver in the vehicle interior, and is located above the FOOT outlet 29A. Then, the DEF outlet 29C is an outlet to blow out the air to an inner surface of a front glass of the vehicle, and is located at the highest position above other outlets 29A and 29B.

Then, the FOOT outlet 29A, the VENT outlet 29B, and the DEF outlet 29C are respectively provided with a FOOT outlet damper 31A, a VENT outlet damper 31B, and a DEF outlet damper 31C to control a blow-out amount of the air.

Figure 2:
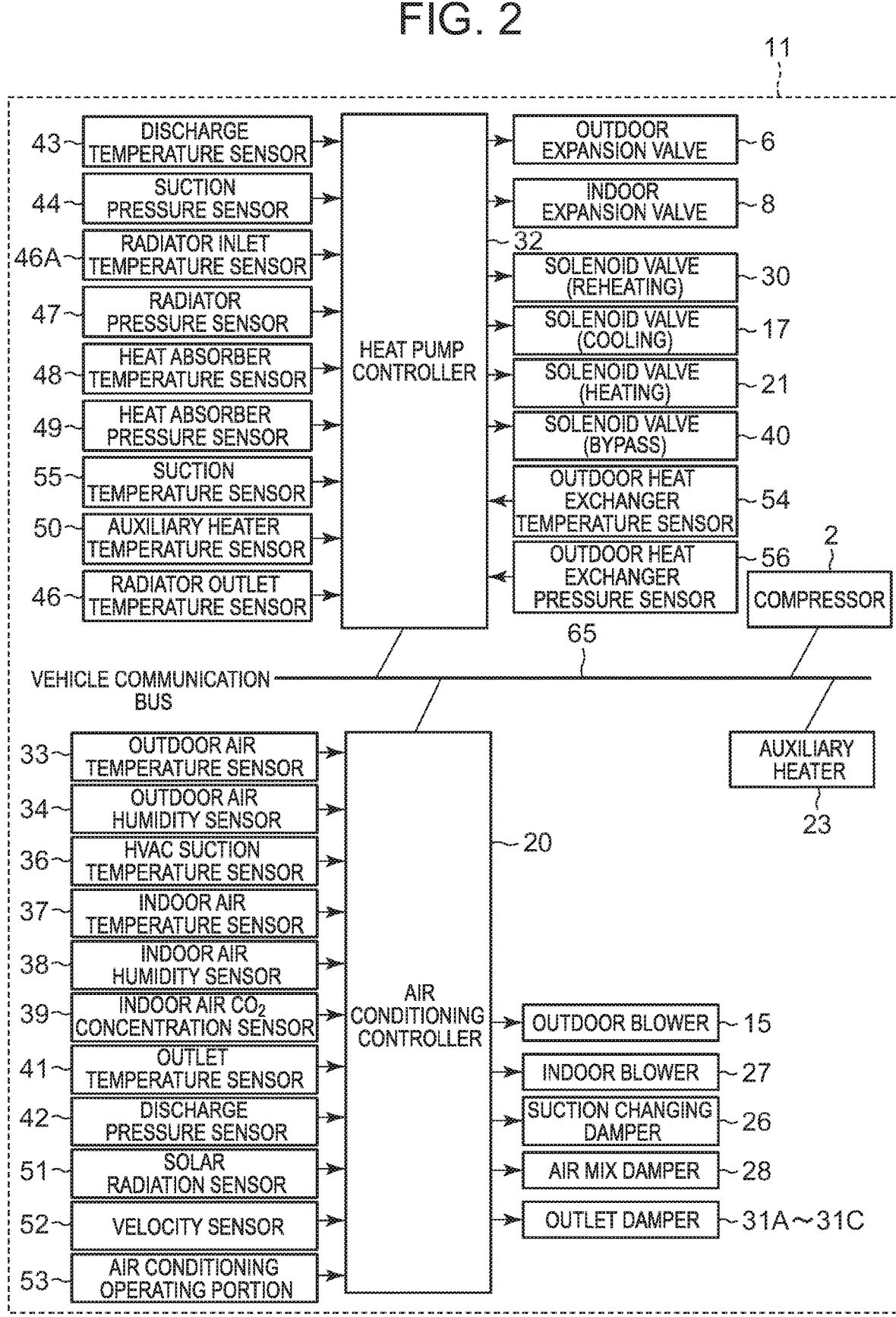
FIG. 2 is a block diagram of a control device of the vehicular air conditioning device of FIG. 1.

Next, FIG. 2 shows a block diagram of a control device 11 of the vehicular air conditioning device 1 of the embodiment. The control device 11 is constituted of an air conditioning controller 20 and a heat pump controller 32 both constituted of a microcomputer as an example of a computer having a processor. These are connected to a vehicle communication bus 65 which constitutes a CAN (Controller Area Network) or a LIN (Local Interconnect Network). Further, the compressor 2 and the auxiliary heater 23 are also connected to the vehicle communication bus 65. These air conditioning controller 20, heat pump controller 32, compressor 2 and auxiliary heater 23 are constituted to perform transmission and reception of data through the vehicle communication bus 65.

The air conditioning controller 20 is a high-order controller which performs control of vehicle interior air conditioning of the vehicle. An input of the air conditioning controller 20 is connected with respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature (a suction air temperature Tas) of the air to be sucked from the suction port 25 to the air flow passage 3 and flow into the heat absorber 9, an indoor air temperature sensor 37 which detects a temperature (an indoor temperature Tin) of the air (the indoor air) of the vehicle interior, an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out to the vehicle interior, a discharge pressure sensor 42 which detects a discharge refrigerant pressure Pd (a discharge pressure Pd) of the compressor 2, a solar radiation sensor 51 of, e.g., a photo sensor system to detect a solar radiation amount into the vehicle, and a velocity sensor 52 to detect a moving speed (a velocity) of the vehicle, and an air conditioning (aircon) operating portion 53 to set the changing of a predetermined temperature or the operation mode.

Further, an output of the air conditioning controller 20 is connected with the outdoor blower 15, the indoor blower (the blower fan) 27, the suction changing damper 26, the air mix damper 28, and the respective outlet dampers 31A through 31C, and they are controlled by the air conditioning controller 20.

The heat pump controller 32 is a controller which mainly performs control of the refrigerant circuit R. An input of the heat pump controller 32 is connected with respective outputs of a discharge temperature sensor 43 which detects a temperature of the refrigerant discharged from the compressor 2, a suction pressure sensor 44 which detects a pressure of the refrigerant to be sucked into the compressor 2, a suction temperature sensor 55 which detects a temperature Ts of the refrigerant to be sucked into the compressor 2, a radiator outlet temperature sensor 46 which detects a refrigerant temperature (a radiator outlet temperature TCI) of an outlet of the radiator 4, a radiator inlet temperature sensor 46A which detects a refrigerant temperature (radiator inlet temperature TCIin) of an inlet of the radiator 4, a radiator pressure sensor 47 which detects a refrigerant pressure (a radiator pressure PCI) of the radiator 4, a heat absorber temperature sensor 48 which detects a refrigerant temperature (a heat absorber temperature Te) of the heat absorber 9, a heat absorber pressure sensor 49 which detects a refrigerant pressure of the heat absorber 9, an auxiliary heater temperature sensor 50 which detects a temperature (an auxiliary heater temperature Tptc) of the auxiliary heater 23, an outdoor heat exchanger temperature sensor 54 which detects a refrigerant temperature (an outdoor heat exchanger temperature TXO) of the outdoor heat exchanger 7, and an outdoor heat exchanger pressure sensor 56 which detects a refrigerant pressure (an outdoor heat exchanger pressure PXO) of the outdoor heat exchanger 7.

Further, an output of the heat pump controller 32 is connected with respective solenoid valves of the outdoor expansion valve 6, the indoor expansion valve 8, the solenoid valve 30 (for the reheating), the solenoid valve 17 (for the cooling), the solenoid valve 21 (for the heating), and the solenoid valve 40 (for the bypass), and they are controlled by the heat pump controller 32. Incidentally, the compressor 2 and the auxiliary heater 23 respectively have controllers incorporated therein, and the controllers of the compressor 2 and the auxiliary heater 23 perform transmission and reception of data to and from the heat pump controller 32 via the vehicle communication bus 65 and are controlled by the heat pump controller 32.

The heat pump controller 32 and the air conditioning controller 20 mutually perform transmission and reception of the data via the vehicle communication bus 65 and control respective devices on the basis of the outputs of the respective sensors and the setting input by the air conditioning operating portion 53. However, in the embodiment in this case, the outputs of the outdoor air temperature sensor 33, the discharge pressure sensor 42, the velocity sensor 52, and the air conditioning operating portion 53 are transmitted from the air conditioning controller 20 to the heat pump controller 32 through the vehicle communication bus 65 and adapted to be supplied for control by the heat pump controller 32.

With the above constitution, an operation of the vehicular air conditioning device 1 of the embodiment will next be described. In the embodiment, the control device 11 (the air conditioning controller 20 and the heat pump controller 32) changes and executes the respective operation modes of the heating mode, the dehumidifying and heating mode, the dehumidifying and cooling mode, the cooling mode, the MAX cooling mode (maximum cooling mode), and the auxiliary heater single mode. Description will initially be made as to an outline of a flow and control of the refrigerant in each operation mode.

(1) Heating Mode

When the heating mode is selected by the heat pump controller 32 (an automatic mode) or a manual operation to the air conditioning operating portion 53 (a manual mode), the heat pump controller 32 opens the solenoid valve 21 (for the heating) and closes the solenoid valve 17 (for the cooling). The heat pump controller 32 also opens the solenoid valve 30 (for the reheating) and closes the solenoid valve 40 (for the bypass). Then, the heat pump controller 32 operates the compressor 2. The air conditioning controller 20 operates the respective blowers 15 and 27, and the air mix damper 28 basically has a state of passing all the air in the air flow passage 3, which is blown out from the indoor blower 27 and then flows via the heat absorber 9, through the auxiliary heater 23 and the radiator 4 in the heating heat exchange passage 3A, but may adjust an air volume.

In consequence, a high-temperature high-pressure gas refrigerant discharged from the compressor 2 flows from the refrigerant pipe 13G into the radiator 4 via the solenoid valve 30. The air in the air flow passage 3 passes through the radiator 4, and hence the air in the air flow passage 3 is heated by the high-temperature refrigerant in the radiator 4 (by the auxiliary heater 23 and the radiator 4 when the auxiliary heater 23 operates). On the other hand, the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump. Then, the low-temperature refrigerant flowing out from the outdoor heat exchanger 7 flows through the refrigerant pipe 13A, the solenoid valve 21, and the refrigerant pipe 13D, and flows from the refrigerant pipe 13C into the accumulator 12 to perform gas-liquid separation thereat, and thereafter the gas refrigerant is sucked into the compressor 2, thereby repeating this circulation. The air heated by the radiator 4 (the auxiliary heater 23 and the radiator 4 when the auxiliary heater 23 operates) is blown out from the respective outlets 29A through 29C, and hence the heating of the vehicle interior is performed.

The heat pump controller 32 calculates a target radiator pressure PCO (a target value of the radiator pressure PCI) from a target heater temperature TCO (a target value of the radiator outlet temperature TCI) calculated from a target outlet temperature TAO by the air conditioning controller 20, and controls the number of revolutions NC of the compressor 2 on the basis of the target radiator pressure PCO and the refrigerant pressure (the radiator pressure PCI that is a high pressure of the refrigerant circuit R) of the radiator 4 which is detected by the radiator pressure sensor 47 to control heating by the radiator 4. Further, the heat pump controller 32 controls a valve position of the outdoor expansion valve 6 on the basis of the refrigerant temperature (the radiator outlet temperature TCI) of the outlet of the radiator 4 which is detected by the radiator outlet temperature sensor 46 and the radiator pressure PCI detected by the radiator pressure sensor 47, and controls a subcool degree SC of the refrigerant in the outlet of the radiator 4.

Further, when the heating capability by the radiator 4 runs shorter than a heating capability required for vehicle-interior air conditioning in the heating mode, the heat pump controller 32 controls energization of the auxiliary heater 23 to complement its lack by the generation of heat by the auxiliary heater 23. Thus, the comfortable heating of the vehicle interior is achieved and frosting of the outdoor heat exchanger 7 is also suppressed. At this time, since the auxiliary heater 23 is disposed on the air upstream side of the radiator 4, the air flowing through the air flow passage 3 passes through the auxiliary heater 23 before the radiator 4.

Here, when the auxiliary heater 23 is disposed on the air downstream side of the radiator 4, the temperature of the air flowing into the auxiliary heater 23 rises by the radiator 4 where the auxiliary heater 23 is constituted of the PTC heater as in the embodiment. Hence, a resistance value of the PTC heater becomes large and a current value thereof also becomes low, so that its generated heat amount is reduced, but the capability of the auxiliary heater 23 constituted of the PTC heater as in the embodiment can be exhibited sufficiently by disposing the auxiliary heater 23 on the air upstream side of the radiator 4.

(2) Dehumidifying and Heating Mode

Next, in the dehumidifying and heating mode, the heat pump controller 32 opens the solenoid valve 17 and closes the solenoid valve 21. Further, the heat pump controller 32 closes the solenoid valve 30 and opens the solenoid valve 40, and fully closes the valve position of the outdoor expansion valve 6. Then, the heat pump controller 32 operates the compressor 2. The air conditioning controller 20 operates the respective blowers 15 and 27, and the air mix damper 28 basically has a state of passing all the air in the air flow passage 3, which is blown out from the indoor blower 27 and then flows via the heat absorber 9, through the auxiliary heater 23 and the radiator 4 in the heating heat exchange passage 3A, but performs an air volume adjustment as well.

Consequently, the high-temperature high-pressure gas refrigerant discharged from the compressor 2 to the refrigerant pipe 13G flows into the bypass pipe 35 without flowing to the radiator 4 and reaches the refrigerant pipe 13E on the downstream side of the outdoor expansion valve 6 through the solenoid valve 40. At this time, since the outdoor expansion valve 6 is fully closed, the refrigerant flows into the outdoor heat exchanger 7. The refrigerant flowing into the outdoor heat exchanger 7 is cooled by the running therein or the outdoor air to pass through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. After the refrigerant is decompressed in the indoor expansion valve 8, the refrigerant flows into the heat absorber 9 to evaporate. The air blown out from the indoor blower 27 is cooled by the heat absorbing operation at this time, and the water in the air coagulates to adhere to the heat absorber 9, and hence, the air in the air flow passage 3 is cooled and dehumidified. The refrigerant evaporated in the heat absorber 9 flows through the internal heat exchanger 19 to reach the accumulator 12 via the refrigerant pipe 13C, and is sucked into the compressor 2 therethrough, thereby repeating this circulation.

At this time, since the valve position of the outdoor expansion valve 6 is fully closed, it is possible to suppress or prevent the disadvantage that the refrigerant discharged from the compressor 2 reversely flows from the outdoor expansion valve 6 into the radiator 4. Thus, the lowering of a refrigerant circulation amount is suppressed or eliminated to enable an air conditioning capacity to be ensured. Further, in the dehumidifying and heating mode, the heat pump controller 32 energizes the auxiliary heater 23 to generate heat. Consequently, the air cooled and dehumidified in the heat absorber 9 is further heated in the process of passing through the auxiliary heater 23, and the temperature rises so that the dehumidifying and heating of the vehicle interior are performed.

The heat pump controller 32 controls the number of revolutions NC of the compressor 2 on the basis of a temperature (the heat absorber temperature Te) of the heat absorber 9 detected by the heat absorber temperature sensor 48 and a target heat absorber temperature TEO being a target value of the heat absorber temperature Te calculated by the air conditioning controller 20, and controls energization (heating by heat generation) of the auxiliary heater 23 on the basis of the auxiliary heater temperature Tptc detected by the auxiliary heater temperature sensor 50 and the above-described target heater temperature TCO (which becomes a target value of the auxiliary heater temperature Tptc in this case), thereby appropriately preventing the lowering of a temperature of the air to be blown out from the respective outlets 29A through 29C to the vehicle interior by the heating by the auxiliary heater 23 while appropriately performing the cooling and dehumidifying of the air by the heat absorber 9. Consequently, it is possible to control the temperature of the air blown out to the vehicle interior to a suitable heating temperature while dehumidifying the air, and to achieve comfortable and efficient dehumidifying and heating of the vehicle interior.

Incidentally, since the auxiliary heater 23 is disposed on the air upstream side of the radiator 4, the air heated in the auxiliary heater 23 passes through the radiator 4, but the refrigerant is not caused to flow into the radiator 4 in the dehumidifying and heating mode. Hence, there is also eliminated the disadvantage that the radiator 4 absorbs heat from the air heated by the auxiliary heater 23. That is, the temperature of the air blown out to the vehicle interior is suppressed from being lowered by the radiator 4, and a COP is also improved.

(3) Dehumidifying and Cooling Mode

Next, in the dehumidifying and cooling mode, the heat pump controller 32 opens the solenoid valve 17 and closes the solenoid valve 21. Further, the heat pump controller 32 opens the solenoid valve 30 and closes the solenoid valve 40. Then, the heat pump controller 32 operates the compressor 2. The air conditioning controller 20 operates the respective blowers 15 and 27, and the air mix damper 28 basically has a state of passing all the air in the air flow passage 3, which is blown out from the indoor blower 27 and then flows via the heat absorber 9, through the auxiliary heater 23 and the radiator 4 in the heating heat exchange passage 3A, but performs an adjustment of an air volume as well.

Thus, the high-temperature high-pressure gas refrigerant discharged from the compressor 2 flows from the refrigerant pipe 13G into the radiator 4 via the solenoid valve 30. Since the air in the air flow passage 3 passes through the radiator 4, the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the internal heat exchanger 19 to reach the accumulator 12 through the refrigerant pipe 13C, and flows therethrough to be sucked into the compressor 2, thereby repeating this circulation. Since the heat pump controller 32 does not perform energization to the auxiliary heater 23 in the dehumidifying and cooling mode, the air cooled and dehumidified by the heat absorber 9 is reheated (radiation capability being lower than that during the heating) in the process of passing the radiator 4. Thus, the dehumidifying and cooling of the vehicle interior are performed.

The heat pump controller 32 controls the number of revolutions NC of the compressor 2 on the basis of the temperature (the heat absorber temperature Te) of the heat absorber 9 which is detected by the heat absorber temperature sensor 48, and the target heat absorber temperature TEO (transmitted from the air conditioning controller 20) being its target value. Also, the heat pump controller 32 calculates a target radiator pressure PCO from the above-described target heater temperature TCO, and controls the valve position of the outdoor expansion valve 6 on the basis of the target radiator pressure PCO and the refrigerant pressure (the radiator pressure PCI that is a high pressure of the refrigerant circuit R) of the radiator 4 which is detected by the radiator pressure sensor 47 to control heating by the radiator 4.

(4) Cooling Mode

Next, in the cooling mode, the heat pump controller 32 fully opens the valve position of the outdoor expansion valve 6 in the above state of the dehumidifying and cooling mode. Then, the heat pump controller 32 operates the compressor 2 and does not perform energization to the auxiliary heater 23. The air conditioning controller 20 operates the respective blowers 15 and 27, and the air mix damper 28 has a state of adjusting a ratio at which the air in the air flow passage 3 blown out from the indoor blower 27 and passed through the heat absorber 9 is to be passed through the auxiliary heater 23 and the radiator 4 in the heating heat exchange passage 3A.

Consequently, the high-temperature high-pressure gas refrigerant discharged from the compressor 2 flows from the refrigerant pipe 13G into the radiator 4 through the solenoid valve 30, and the refrigerant flowing out from the radiator 4 flows through the refrigerant pipe 13E to reach the outdoor expansion valve 6. At this time, the outdoor expansion valve 6 is fully opened, and hence, the refrigerant passes therethrough and flows into the outdoor heat exchanger 7 as it is, where the refrigerant is air-cooled by the running therein or the outdoor air to pass through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. The refrigerant is decompressed in the indoor expansion valve 8 and then flows into the heat absorber 9 to evaporate. The air blown out from the indoor blower 27 is cooled by the heat absorbing operation at this time. Further, the water in the air coagulates to adhere to the heat absorber 9.

The refrigerant evaporated in the heat absorber 9 flows through the internal heat exchanger 19 to reach the accumulator 12 through the refrigerant pipe 13C, and flows therethrough to be sucked into the compressor 2, thereby repeating this circulation. The air cooled and dehumidified in the heat absorber 9 is blown out from the respective outlets 29A through 29C to the vehicle interior (a part thereof passes through the radiator 4 to perform heat exchange), thereby performing the cooling of the vehicle interior. Further, in this cooling mode, the heat pump controller 32 controls the number of revolutions NC of the compressor 2 on the basis of the temperature (the heat absorber temperature Te) of the heat absorber 9 which is detected by the heat absorber temperature sensor 48, and the above-described target heat absorber temperature TEO being its target value.

(5) MAX Cooling Mode (Maximum Cooling Mode)

Next, in the MAX cooling mode as the maximum cooling mode, the heat pump controller 32 opens the solenoid valve 17 and closes the solenoid valve 21. Further, the heat pump controller 32 closes the solenoid valve 30 and opens the solenoid valve 40, and fully closes the valve position of the outdoor expansion valve 6. Then, the heat pump controller 32 operates the compressor 2 and does not perform energization to the auxiliary heater 23. The air conditioning controller 20 operates the respective blowers 15 and 27, and the air mix damper 28 has a state in which the air in the air flow passage 3 does not pass through the auxiliary heater 23 and the radiator 4 in the heating heat exchange passage 3A. However, even when the air slightly passes, there are not any problems.

Thus, the high-temperature high-pressure gas refrigerant discharged from the compressor 2 to the refrigerant pipe 13G flows into the bypass pipe 35 without flowing to the radiator 4, and reaches the refrigerant pipe 13E on the downstream side of the outdoor expansion valve 6 through the solenoid valve 40. At this time, since the outdoor expansion valve 6 is fully closed, the refrigerant flows into the outdoor heat exchanger 7. The refrigerant flowing into the outdoor heat exchanger 7 is air-cooled by the running therein or the outdoor air to pass through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. The refrigerant is decompressed in the indoor expansion valve 8 and then flows into the heat absorber 9 to evaporate. The air blown out from the indoor blower 27 is cooled by the heat absorbing operation at this time. Further, since the water in the air coagulates to adhere to the heat absorber 9, the air in the air flow passage 3 is dehumidified. A circulation is repeated in which the refrigerant evaporated in the heat absorber 9 flows through the internal heat exchanger 19 to reach the accumulator 12 via the refrigerant pipe 13C, and flows therethrough to be sucked into the compressor 2. At this time, since the outdoor expansion valve 6 is fully closed, it is possible to similarly suppress or prevent the disadvantage that the refrigerant discharged from the compressor 2 reversely flows from the outdoor expansion valve 6 to the radiator 4. Thus, the lowering of a refrigerant circulation amount is suppressed or eliminated to enable an air conditioning capacity to be ensured.

Here, since the high-temperature refrigerant flows into the radiator 4 in the above-described cooling mode, direct heat conduction from the radiator 4 to the HVAC unit 10 occurs in no small way. Since, however, the refrigerant does not flow into the radiator 4 in the MAX cooling mode, the air in the air flow passage 3 from the heat absorber 9 is not heated by the heat transferred from the radiator 4 to the HVAC unit 10. Therefore, the strong cooling of the vehicle interior is performed, and under such an environment that the outdoor air temperature Tam is high in particular, the vehicle interior is rapidly cooled to make it possible to achieve comfortable vehicle interior air conditioning. Further, even in the MAX cooling mode, the heat pump controller 32 controls the number of revolutions NC of the compressor 2 on the basis of the temperature (the heat absorber temperature Te) of the heat absorber 9 which is detected by the heat absorber temperature sensor 48, and the above-describe target heat absorber temperature TEO being its target value.

(6) Auxiliary Heater Single Mode

Incidentally, the control device 11 of the embodiment has an auxiliary heater signal mode of in the cases such as when excessive frosting occurs in the outdoor heat exchanger 7, etc., stopping the compressor 2 and the outdoor blower 15 in the refrigerant circuit R, and energizing the auxiliary heater 23 to heat the vehicle interior only by the auxiliary heater 23. Even in this case, the heat pump controller 32 controls energization (heat generation) of the auxiliary heater 23 on the basis of the auxiliary heater temperature Tptc detected by the auxiliary heater temperature sensor 50 and the above-described target heater temperature TCO.

Further, the air conditioning controller 20 operates the indoor blower 27, and the air mix damper 28 has a state of passing the air in the air flow passage 3, which is blown out from the indoor blower 27, through the auxiliary heater 23 of the heating heat exchange passage 3A to adjust an air volume. The air heated by the auxiliary heater 23 is blown out from the respective outlets 29A through 29C to the vehicle interior, and hence the heating of the vehicle interior is performed.

(7) Changing of Operation Mode

The air conditioning controller 20 calculates the aforementioned target outlet temperature TAO from the following equation (I). The target outlet temperature TAO is a target value of the temperature of the air blown out to the vehicle interior.

$$TAO=(Tset-Tin) \times K+Tbal(f(Tset,SUN,Tam)) \quad (I)$$

where Tset is a predetermined temperature of the vehicle interior which is set by the air conditioning operating portion 53, Tin is an interior temperature detected by the indoor air temperature sensor 37, K is a coefficient, and Tbal is a balance value calculated from the predetermined value Tset, the solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the target outlet temperature TAO is lowered with rising of the outdoor air temperature Tam.

The heat pump controller 32 selects any operation mode from the above respective operation modes on the basis of the outdoor air temperature Tam (detected by the outdoor air temperature sensor 33) and the target outlet temperature TAO transmitted from the air conditioning controller 20 via the vehicle communication bus 65 on startup, and transmits the respective operation modes to the air conditioning controller 20 through the vehicle communication bus 65. Further, after the startup, the heat pump controller 32 changes the respective operation modes on the basis of parameters such as the outdoor air temperature Tam, the humidity of the vehicle interior, the target outlet temperature TAO, a heating temperature TH (a temperature of the air on the leeward side of the radiator 4, which is an estimated value) to be described later, the target heater temperature TCO, the heat absorber temperature Te, the target heat absorber temperature TEO, the presence or absence of a dehumidifying request for the vehicle interior, etc. and thereby appropriately changes the heating mode, the dehumidifying and heating mode, the dehumidifying and cooling mode, the cooling mode, the MAX cooling mode, and the auxiliary heater single mode according to environment conditions or the dehumidifying request to control the temperature of the air blown out to the vehicle interior to the target outlet temperature TAO, thereby achieving comfortable and efficient vehicle interior air conditioning.

(8) Control of Compressor 2 in Heating Mode by Heat Pump Controller 32

Figure 4:
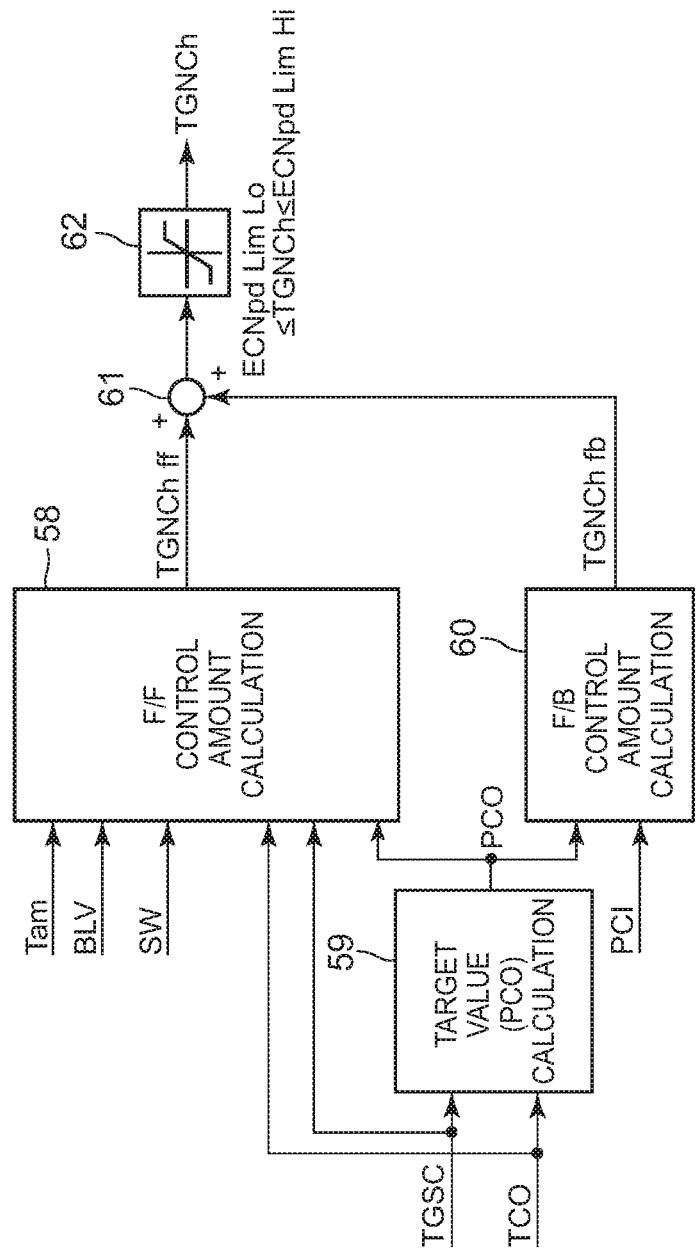
FIG. 4 is a control block diagram concerning compressor control in a heating mode of a heat pump controller of FIG. 2.

Next, description will be made as to control of the compressor 2 in the aforementioned heating mode in detail using FIG. 4. FIG. 4 is a control block diagram of the heat pump controller 32 which determines a target number of revolutions (a compressor target number of revolutions) TGNCh of the compressor 2 for the heating mode. An F/F (feedforward) control amount calculation section 58 of the heat pump controller 32 calculates an F/F control amount TGNChff of the compressor target number of revolutions on the basis of the outdoor air temperature Tam obtainable from the outdoor air temperature sensor 33, a blower voltage BLV of the indoor blower 27, an air volume ratio SW by the air mix damper 28, which is obtained by SW=(TAO−Te)/(TH−Te), a target subcool degree TGSC that is a target value of a subcool degree SC in the outlet of the radiator 4, the above-mentioned target heater temperature TCO (transmitted from the air conditioning controller 20) that is the target value of the temperature of the radiator 4, and the target radiator pressure PCO that is the target value of the pressure of the radiator 4.

Here, the above TH used to calculate the air volume ratio SW is a temperature (hereinafter called a heating temperature) of the air on the leeward side of the radiator 4. The heat pump controller 32 estimates the TH from a first-order lag calculation formula (II) shown below:

$$TH=(INTL \times TH0+Tau \times THz)/(Tau+INTL) \quad (II)$$

where INTL is a calculation period (constant), Tau is a time constant of a first-order lag, TH0 is a steady-state value of the heating temperature TH in a steady state before a first-order lag calculation, and THz is a previous value of the heating temperature TH. Estimating the heating temperature TH in this manner makes it unnecessary to provide a special temperature sensor.

Incidentally, the heat pump controller 32 changes the above time constant Tau and steady-state value TH0 according to the aforementioned operation modes to thereby make the above-described estimation formula (II) different depending on the operation mode to estimate the heating temperature TH. It will however be described in detail later. Then, the heating temperature TH is transmitted to the air conditioning controller 20 through the vehicle communication bus 65.

The target radiator pressure PCO is calculated by the target value calculation section 59 on the basis of the above target subcool degree TGSC and target heater temperature TCO. Further, an F/B (feedback) control amount calculation section 60 calculates an F/B control amount TGNChfb of a compressor target number of revolutions on the basis of the target radiator pressure PCO and the radiator pressure PCI being the refrigerant pressure of the radiator 4. Then, the F/F control amount TGNCnff calculated by the F/F control amount calculation section 58 and TGNChfb calculated by the F/B control amount calculation section 60 are added in an adder 61, and its result is added with limits of an upper limit of controlling and a lower limit of controlling in a limit setting section 62, followed by being determined as the compressor target number of revolutions TGNCh. In the heating mode, the heat pump controller 32 controls the number of revolutions NC of the compressor 2 on the basis of the compressor target number of revolutions TGNCh.

(9) Control of Compressor 2 and Auxiliary Heater 23 in Dehumidifying and Heating Mode by Heat Pump Controller 32

Figure 5:
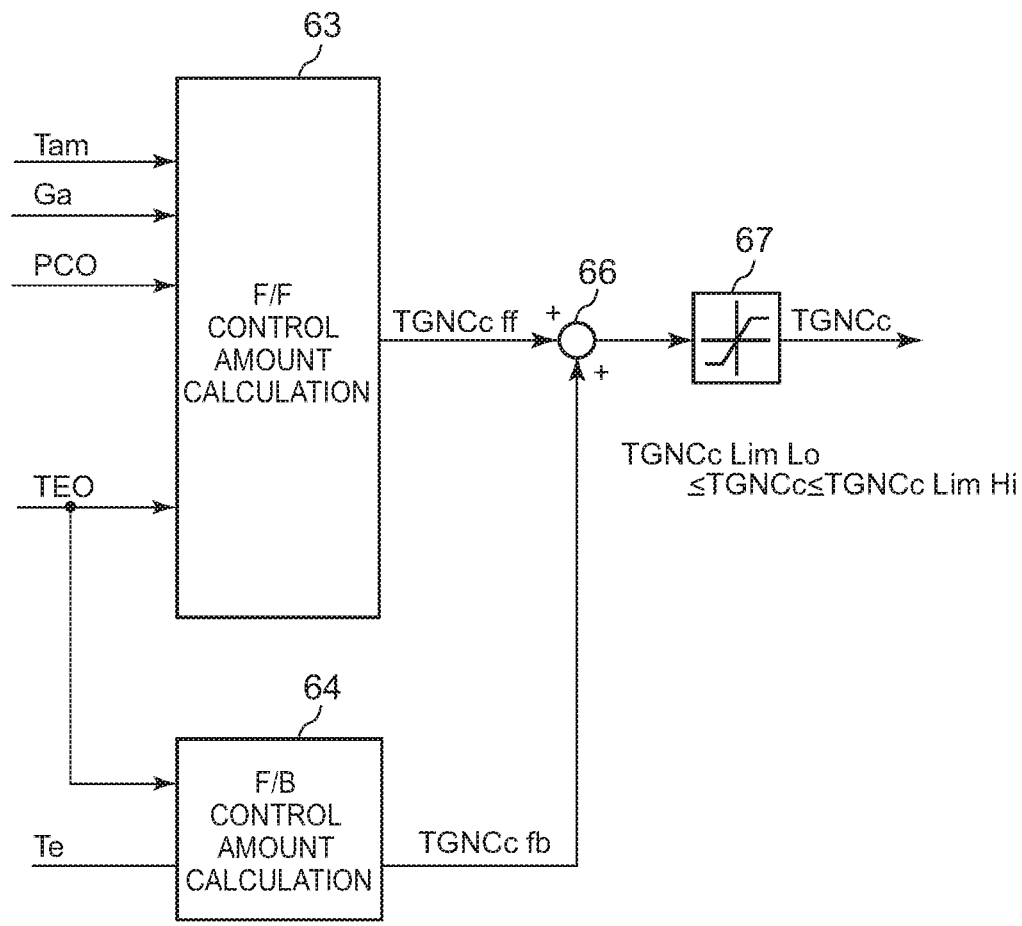
FIG. 5 is a control block diagram concerning compressor control in a dehumidifying and heating mode of the heat pump controller of FIG. 2.

On the other hand, FIG. 5 is a control block diagram of the heat pump controller 32 which determines a target number of revolutions (a compressor target number of revolutions) TGNCc of the compressor 2 for the dehumidifying and heating mode. The F/F control amount calculation section 63 of the heat pump controller 32 calculates an F/F control amount TGNCcff of the compressor target number of revolutions on the basis of the outdoor air temperature Tam, the volumetric air volume Ga of the air flowing into the air flow passage 3, the target radiator pressure PCO being a target value of the pressure (the radiator pressure PCI) of the radiator 4, and the target heat absorber temperature TEO being a target value of the temperature (the heat absorber temperature Te) of the heat absorber 9.

Further, the F/B control amount calculation section 64 calculates an F/B control amount TGNCcfb of the compressor target number of revolutions on the basis of the target heat absorber temperature TEO (transmitted from the air conditioning controller 20), and the heat absorber temperature Te. Then, the F/F control amount TGNCcff calculated by the F/F control amount calculation section 63 and the F/B control amount TGNCcfb calculated by the F/B control amount calculation section 64 are added in an adder 66, and its result is added with limits of an upper limit of controlling and a lower limit of controlling in a limit setting section 67 and then determined as the compressor target number of revolutions TGNCc. In the dehumidifying and heating mode, the heat pump controller 32 controls the number of revolutions NC of the compressor 2 on the basis of the compressor target number of revolutions TGNCc.

Figure 6:
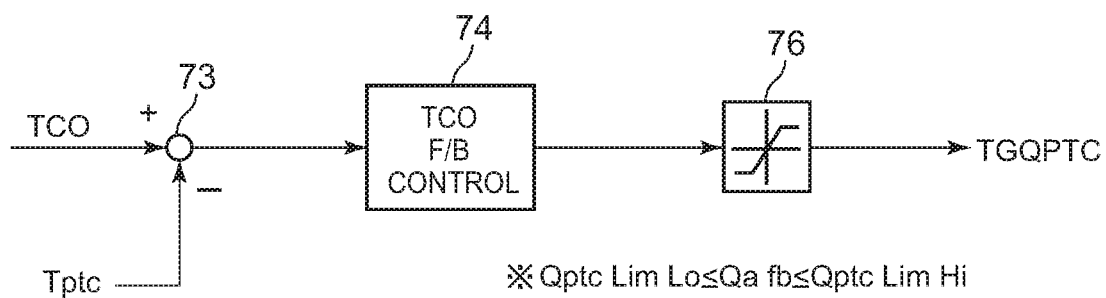
FIG. 6 is a control block diagram concerning auxiliary heater (auxiliary heating device) control in the dehumidifying and heating mode of the heat pump controller of FIG. 2.

Further, FIG. 6 is a control block diagram of the heat pump controller 32 which determines an auxiliary heater required capability TGQPTC of the auxiliary heater 23 in the dehumidifying and heating mode. The target heater temperature TCO and the auxiliary heater temperature Tptc are input to a subtractor 73 of the heat pump controller 32 to calculate a deviation (TCO-Tptc) between the target heater temperature TCO and the auxiliary heater temperature Tptc. The deviation (TCO-Tptc) is input to the F/B control section 74. The F/B control section 74 eliminates the deviation (TCO-Tptc) and calculates an auxiliary heater required capability F/B control amount so that the auxiliary heater temperature Tptc becomes the target heater temperature TCO.

The auxiliary heater required capability F/B control amount calculated in the F/B control section 74 is added with an upper limit of controlling and a lower limit of controlling in the limit setting section 76 and then determined as the auxiliary heater required capability TGQPTC. In the dehumidifying and heating mode, the controller 32 controls energization to the auxiliary heater 23 on the basis of the auxiliary heater required capability TGQPTC to thereby control heat generation (heating) of the auxiliary heater 23 such that the auxiliary heater temperature Tptc becomes the target heater temperature TCO.

Thus, in the dehumidifying and heating mode, the heat pump controller 32 controls the operation of the compressor on the basis of the heat absorber temperature Te and the target heat absorber temperature TEO, and controls the heat generation of the auxiliary heater 23 on the basis of the target heater temperature TCO, thereby appropriately controlling cooling and dehumidifying by the heat absorber 9 and heating by the auxiliary heater 23 in the dehumidifying and heating mode. Consequently, while more adequately dehumidifying the air blown out to the vehicle interior, the temperature of the air can be controlled to a more accurate heating temperature, and more comfortable and efficient dehumidifying and heating of the vehicle interior can be achieved.

(10) Control of Air Mix Damper 28

Figure 3:
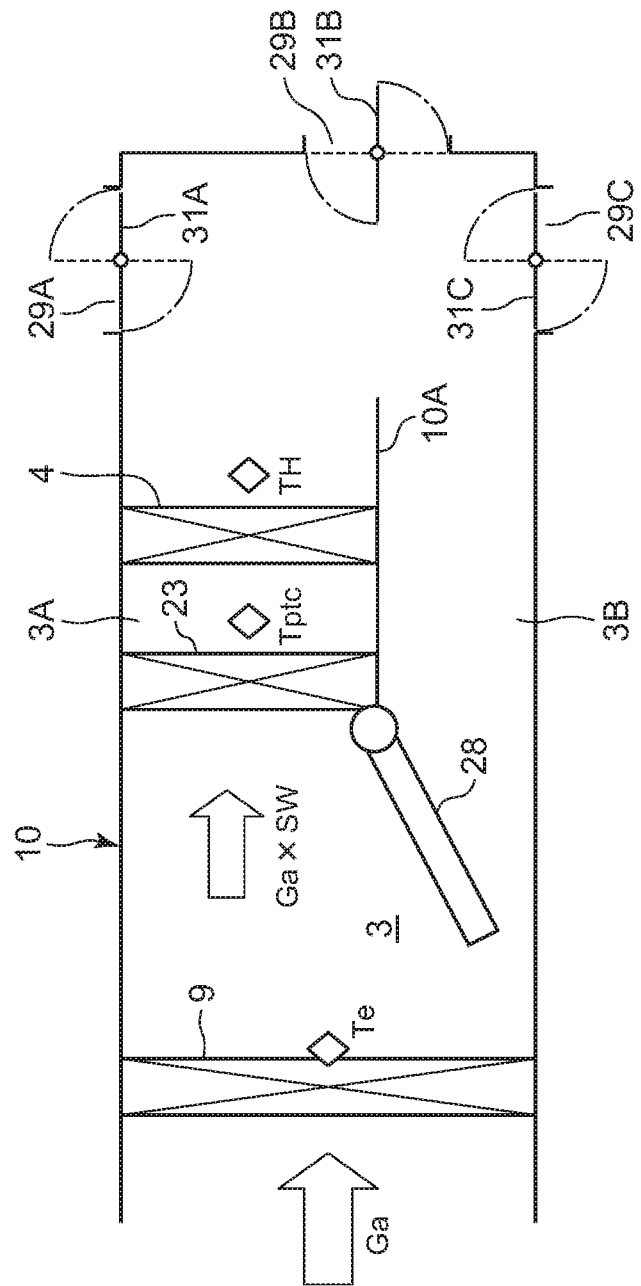
FIG. 3 is a typical diagram of an air flow passage of the vehicular air conditioning device of FIG. 1.

Next, description will be made as to control of the air mix damper 28 by the air conditioning controller 20 while referring to FIG. 3. In FIG. 3, Ga is a volumetric air volume of the air flowing into the above-described air flow passage 3, Te is a heat absorber temperature, and TH is the above-described heating temperature (the temperature of the air on the leeward side of the radiator 4).

On the basis of the air volume ratio SW calculated by the equation (the following equation (III)) and passed through the radiator 4 and the auxiliary heater 23 in the heating heat exchange passage 3A as described above, the air conditioning controller 20 controls the air mix damper 28 so that the air is brought to an air volume of the corresponding ratio, and thereby adjusts an amount of the air passed through the radiator 4 (and the auxiliary heater 23).

$$SW=(TAO-Te)/(TH-Te) \quad (III)$$

That is, the air volume ratio SW at which the air is passed through the radiator 4 and the auxiliary heater 23 in the heating heat exchange passage 3A changes within a range of 0≤SW≤1. "0" indicates an air mix fully-closed state in which all the air in the air flow passage 3 is to be passed through the bypass passage 3B without passing it through the heating heat exchange passage 3A, and "1" indicates an air mix fully-opened state in which all the air in the air flow passage 3 is to be passed through the heating heat exchange passage 3A. That is, the air volume to the radiator 4 becomes Ga×SW.

(11) Estimation of Heating Temperature TH in Operation Mode

As described above, the heating temperature TH that is the temperature of the air on the leeward side of the radiator 4 is calculated by the aforementioned estimation formula (II). Then, the heating temperature TH is utilized for the calculation of the air volume ratio SW at which the air is passed through the radiator 4, and the changing of each operation mode in the air conditioning controller 20, but, as described above, the heat pump controller 32 calculates the heating temperature TH using an estimation formula that differs depending on the operation mode.

In this case, the heat pump controller 32 changes the time constant Tau and the steady-state value TH0 in the formula (II) depending on the operation mode to make the estimation formula (II) that differs depending on the operation mode, and calculates the heating temperature TH by such an estimation formula that differs according to the operation mode. This will be described below while referring to FIGS. 7 through 9.

(11-1) Calculation of Heating Temperature TH in Auxiliary Heater Single Mode or Upon Stopping of Compressor 2 and Auxiliary Heater 23

Figure 7:
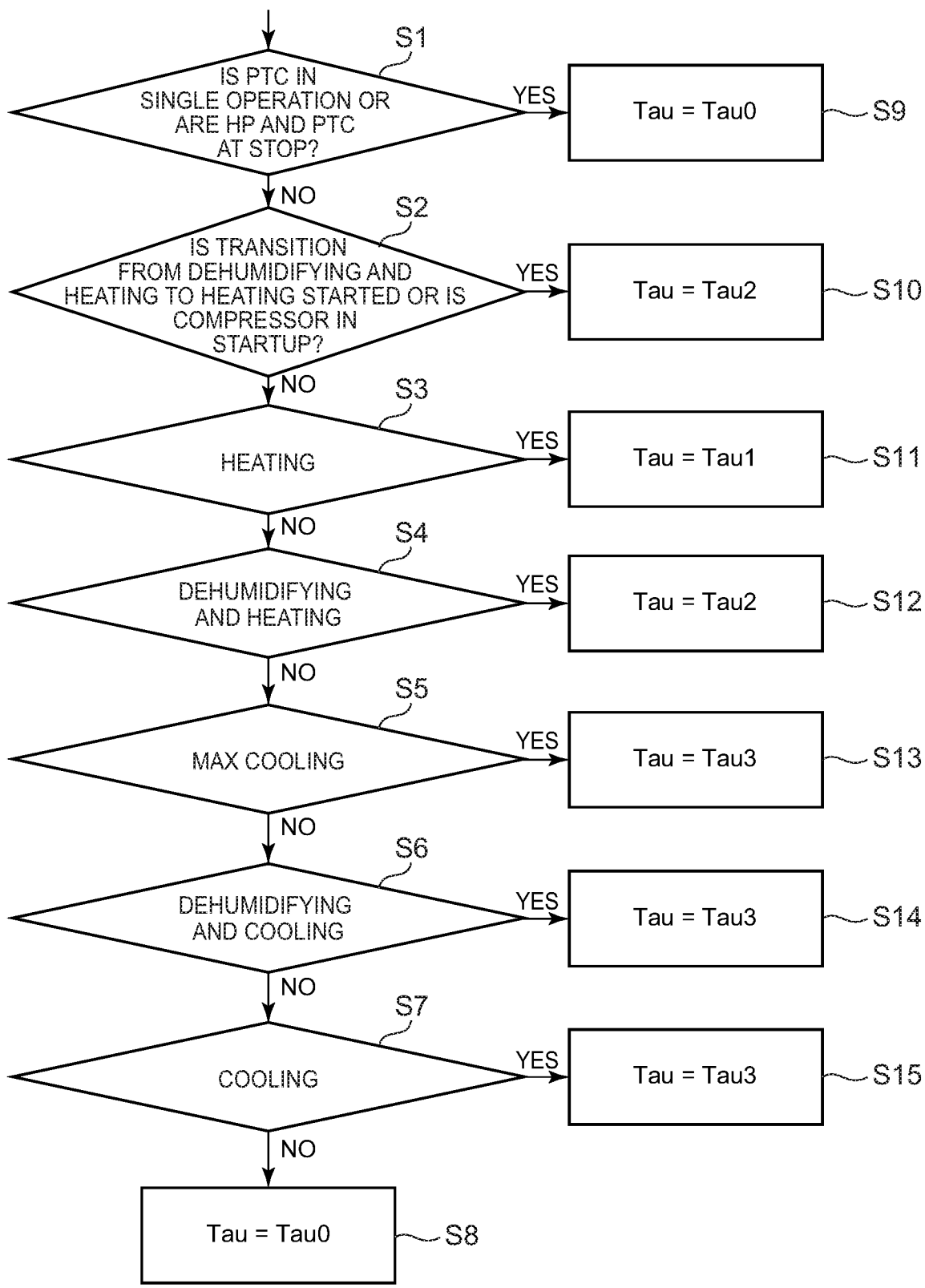
FIG. 7 is a flowchart to describe change control of a time constant Tau by the heat pump controller of FIG. 2.

When the current operation mode is the above-described auxiliary heater single mode (during a PTC single operation in FIGS. 7 and 8), or when the compressor 2 (HP in FIGS. 7 and 8) and the auxiliary heater 23 (PTC in FIGS. 7 and 8) are stopped, the heat pump controller 32 proceeds from Step S1 to Step S9 of FIG. 7 to set the above-described time constant Tau to a time constant Tau0. Further, the heat pump controller 32 determines the above-described steady-state value TH0 to be the above-described auxiliary heater temperature Tptc. Incidentally, in this case, the heat pump controller 32 does not change the time constant Tau0 even if the above-described volumetric air volume Ga changes, and in the embodiment, the heat pump controller 32 sets the time constant to "10" (highest in response speed) as shown in a time constant map of FIG. 8.

Since a change in the temperature of the air on the leeward side of the radiator 4 also becomes fast in the auxiliary heater single mode or in the state in which the compressor 2 and the auxiliary heater 23 stop, the heating temperature TH can be matched with an actual change in the temperature of the air on the leeward side of the radiator 4 by setting the time constant Tau in the estimation formula of TH=(INTL×TH0+Tau×THz)/(Tau+INTL) to Tau0 being a value highest in response speed as described above. Further, since the temperature on the leeward side of the radiator 4 becomes the auxiliary heater temperature Tptc in the auxiliary heater single mode or in the state in which the compressor 2 and the auxiliary heater 23 stop, the heating temperature TH can be estimated appropriately by setting the steady-state value TH0 to the auxiliary heater temperature Tptc.

(11-2) Calculation of Heating Temperature TH when Starting Transition from Dehumidifying and Heating Mode to Heating Mode or During Startup of Compressor 2

Next, when the transition from the dehumidifying and heating mode to the heating mode is started, or when the compressor 2 is during startup, the heat pump controller 32 proceeds from Step S2 to Step S10 of FIG. 7 to determine the aforementioned time constant Tau to be a time constant Tau2. Further, the heat pump controller 32 determines the aforementioned steady-state value TH0 to be the auxiliary heater temperature Tptc. Incidentally, in this case, the heat pump controller 32 does not change the time constant Tau2 even if the above-described volumetric air volume Ga changes, and in the embodiment, the heat pump controller 32 determines the time constant to be "20" (the third-fastest response speed) as shown in the time constant map of FIG. 8.

The change in the temperature of the air on the leeward side of the radiator 4 becomes relatively slow when the transition from the dehumidifying and heating mode to the heating mode is started, or in the state in which the compressor 2 is in starting. Therefore, the time constant Tau in the estimation formula of TH=(INTL×TH0+Tau×THz)/(Tau+INTL) is set to Tau2 at which the response speed is the third-fastest value to thereby make it possible to match the heating temperature TH with the actual change in the temperature of the air on the leeward side of the radiator 4. Further, when the transition from the dehumidifying and heating mode to the heating mode is started, or in the state in which the compressor 2 is in starting, the temperature on the leeward side of the radiator 4 becomes the auxiliary heater temperature Tptc, and hence, the steady-state value TH0 is set to the auxiliary heater temperature Tptc, whereby the heating temperature TH can be estimated appropriately.

(11-3) Calculation of Heating Temperature TH in Heating Mode

Next, when the operation mode is the heating mode, the heat pump controller 32 proceeds from Step S3 to Step S11 of FIG. 7 to determine the aforementioned time constant Tau to be a time constant Tau1. Further, when the compressor 2 is during protection control, the heat pump controller 32 determines the aforementioned steady-state value TH0 to be the auxiliary heater temperature Tptc, and otherwise, the heat pump controller 32 determines the steady-state value TH0 on the basis of a saturation temperature THsatu of the refrigerant, which is obtained from the radiator pressure PCI (the refrigerant pressure of the radiator 4). Incidentally, the protection control of the compressor 2 is control of limiting the maximum value NC max of the number of revolutions NC of the compressor 2 in such a manner that the suction refrigerant temperature Ts of the compressor 2 is not excessively lowered.

Figure 9:
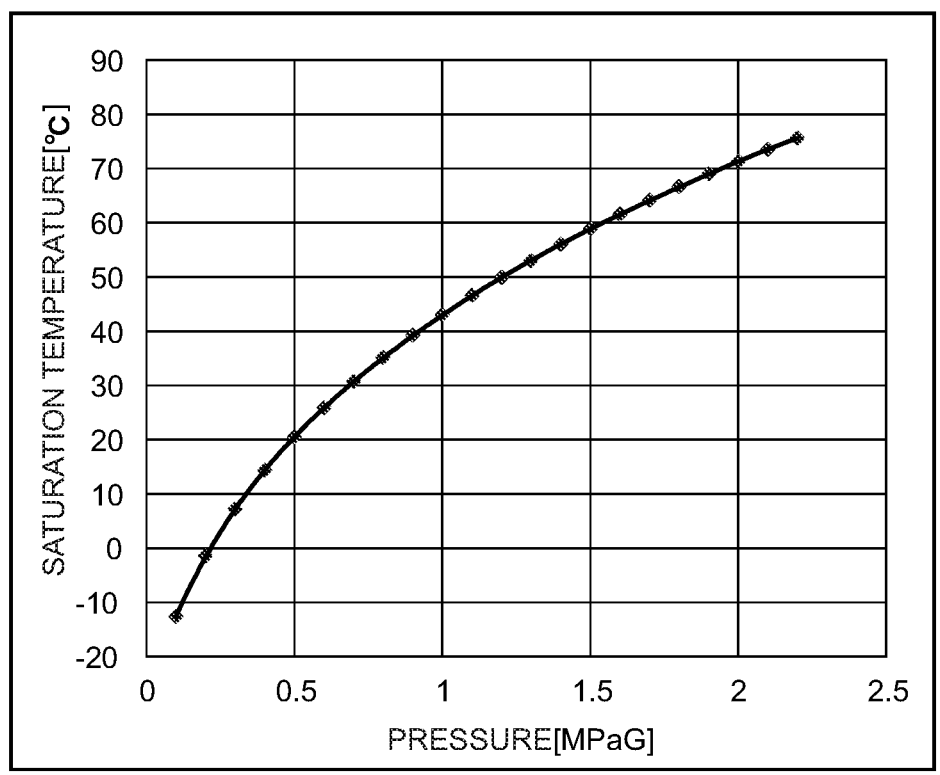
FIG. 9 is a diagram illustrating a relation between an outlet temperature and a saturation temperature of a radiator.

The saturation temperature THsatu is obtained from a table shown in FIG. 9. In the drawing, the horizontal axis is the radiator pressure PCI, and the vertical axis is the saturation temperature THsatu. The saturation temperature THsatu is an average temperature of the radiator 4 having considered the subcool degree SC of the refrigerant in the radiator 4. Further, the heat pump controller 32 corrects the saturation temperature THsatu by a predetermined correction value. The correction value is determined from the subcool degree SC of the refrigerant in the radiator 4, and the volumetric air volume Ga of the air flowing into the air flow passage 3, or determined from the volumetric air volume Ga and the air volume ratio SW at which the air is to be passed through the radiator 4.

Incidentally, in this case, the heat pump controller 32 does not change the time constant Tau1 even if the above-described volumetric air volume Ga changes, and in the embodiment, the heat pump controller 32 determines the time constant to be "15" (the second-fastest response speed) as shown in the time constant map of FIG. 8. In the heating mode, the change in the temperature of the air on the leeward side of the radiator 4 becomes relatively quick, and hence, as described above, the time constant Tau in the estimation formula of TH=(INTL×TH0+Tau×THz)/(Tau+INTL) is set to Tau1 at which the response speed is the second-fastest value, thereby making it possible to match the heating temperature TH with the actual change in the temperature of the air on the leeward side of the radiator 4.

Further, in the heating mode, particularly, the saturation temperature THsatu also changes depending on the subcool degree SC of the refrigerant in the radiator 4, the volumetric air volume Ga of the air flowing into the air flow passage, and the air volume ratio SW at which the air is to be passed through the radiator, and hence a correction value is determined from these to correct the saturation temperature THsatu, whereby the heating temperature TH can be estimated more appropriately.

(11-4) Calculation of Heating Temperature TH in Dehumidifying and Heating Mode

Next, when the operation mode is the dehumidifying and heating mode, the heat pump controller 32 proceeds from Step S4 to Step S12 of FIG. 7 to determine the aforementioned time constant Tau to be the time constant Tau2. Further, the heat pump controller 32 determines the aforementioned steady-state value TH0 to be the auxiliary heater temperature Tptc. Incidentally, even in this case, the heat pump controller 32 does not change the time constant Tau2 regardless of the change in the volumetric air volume Ga, and in the embodiment, the heat pump controller 32 determines the time constant to be "20" (the third-fastest response speed) as shown in the time constant map of FIG. 8.

Since the change in the temperature of the air on the leeward side of the radiator 4 becomes relatively slow in the dehumidifying and heating mode, as described above, the time constant Tau in the estimation formula of TH=(INTL× TH0+Tau×THz)/(Tau+INTL) is set to Tau2 at which the response speed is the third-fastest value, thereby making it possible to match the heating temperature TH with the actual change in the temperature of the air on the leeward side of the radiator 4. Further, since the temperature on the leeward side of the radiator 4 becomes the auxiliary heater temperature Tptc in the dehumidifying and heating mode, the steady-state value TH0 is set to the auxiliary heater temperature Tptc, thereby making it possible to appropriately estimate the heating temperature TH.

(11-5) Calculation of Heating Temperature TH in MAX Cooling Mode

Next, when the operation mode is the MAX cooling mode, the heat pump controller 32 proceeds from Step S5 to Step S13 of FIG. 7 to determine the aforementioned time constant Tau to be a time constant Tau3. Further, the heat pump controller 32 determines the aforementioned steady-state value TH0 to be an average value of the refrigerant inlet temperature TCIin and refrigerant outlet temperature TCI of the radiator 4+a predetermined offset value. Incidentally, in this case, the heat pump controller 32 changes the time constant Tau3 according to the volumetric air volume Ga. In the embodiment, as shown in the time constant map of FIG. 8, the heat pump controller 32 determines the time constant to be "10" (the fastest response speed) when Ga is 500, determines the time constant to be "20" (the third-fastest response speed) when Ga is 400, determines the time constant to be "30" (the second-fastest response speed) when Ga is 300, and determines the time constant to be "40" (the slowest response speed) when Ga is 200 or less. That is, the larger the volumetric air volume Ga is, the faster the response speed is made, and the smaller the volumetric air volume Ga is, the slower the response speed is made.

Since the change in the temperature of the air on the leeward side of the radiator 4 varies depending on the flow rate of the air in the air flow passage 3 in the MAX cooling mode, as described above, the time constant Tau in the estimation formula of TH=(INTL×TH0+Tau×THz)/(Tau+ INTL) is changed depending on the volumetric air volume Ga, thereby making it possible to match the heating temperature TH with the actual change in the temperature of the air on the leeward side of the radiator 4. Further, in the MAX cooling mode, the subcool degree is not applied to the refrigerant in the radiator 4, and hence the average temperature of the radiator 4 is determined from the average value of the refrigerant inlet temperature TCIin and refrigerant outlet temperature TCI of the radiator 4 and simply determined to be the steady-state value TH0, thereby making it possible to appropriately estimate the heating temperature TH.

(11-6) Calculation of Heating Temperature TH in Dehumidifying and Cooling Mode

Next, when the operation mode is the dehumidifying and heating mode, the heat pump controller 32 proceeds from Step S6 to Step S14 of FIG. 7 to determine the aforementioned time constant Tau to be a time constant Tau3. Further, the heat pump controller 32 determines the aforementioned steady-state value TH0 to be a saturation temperature THsatu of the refrigerant obtained from the radiator pressure PCI (the refrigerant pressure of the radiator 4)+a predetermined offset value. Incidentally, even in this case, the heat pump controller 32 changes the time constant Tau3 depending on the volumetric air volume Ga as shown in FIG. 8.

Since the change in the temperature of the air on the leeward side of the radiator 4 varies depending on the flow rate of the air in the air flow passage 3 even in the case of the dehumidifying and heating mode, as described above, the time constant Tau in the estimation formula of TH= (INTL×TH0+Tau×THz)/(Tau+INTL) is changed depending on the volumetric air volume Ga, thereby making it possible to match the heating temperature TH with the actual change in the temperature of the air on the leeward side of the radiator 4. Further, even in the dehumidifying and cooling mode, the steady-state value TH0 is determined on the basis of the saturation temperature THsatu being the average temperature of the radiator 4 having considered the subcool degree SC of the refrigerant in the radiator 4, whereby the heating temperature TH can be estimated appropriately.

(11-7) Calculation of Heating Temperature TH in Cooling Mode

Next, when the operation mode is the cooling mode, the heat pump controller 32 proceeds from Step S7 to Step S15 of FIG. 7 to determine the aforementioned time constant Tau to be a time constant Tau3. Further, the heat pump controller 32 determines the aforementioned steady-state value TH0 to be an average value of the refrigerant inlet temperature TCIin and refrigerant outlet temperature TCI of the radiator 4+a predetermined offset value. Incidentally, even in this case, the heat pump controller 32 changes the time constant Tau3 depending on the volumetric air volume Ga as shown in FIG. 8.

Since the change in the temperature of the air on the leeward side of the radiator 4 varies depending on the flow rate of the air in the air flow passage 3 even in the case of the cooling mode, as described above, the time constant Tau in the estimation formula of TH=(INTL×TH0+Tau×THz)/ (Tau+INTL) is changed depending on the volumetric air volume Ga, thereby making it possible to match the heating temperature TH with the actual change in the temperature of the air on the leeward side of the radiator 4. Further, even in the cooling mode, the subcool degree is not applied to the refrigerant in the radiator 4, and hence the average temperature of the radiator 4 is determined from the average value of the refrigerant inlet temperature TCIin and refrigerant outlet temperature TCI of the radiator 4 and simply determined to be the steady-state value TH0, thereby making it possible to appropriately estimate the heating temperature TH.

(11-8) Calculation of Heating Temperature TH During Operation Stop

Next, when the vehicular air conditioning device 1 stops in operation (system stop), the heat pump controller 32 proceeds from Step S7 to Step S8 of FIG. 7 to determine the aforementioned time constant Tau to be the time constant Tau0. Further, the heat pump controller 32 determines the aforementioned steady-state value TH0 to be the saturation temperature THsatu obtained from the radiator pressure PCI (the refrigerant pressure of the radiator 4)+a predetermined offset value, or determines the aforementioned steady-state value TH0 to be the average value of the refrigerant inlet temperature TCIin and refrigerant outlet temperature TCI of the radiator 4+a predetermined offset value. Incidentally, even in this case, the heat pump controller 32 does not change the time constant Tau0 even if the above-described volumetric air volume Ga changes, and in the embodiment, the heat pump controller 32 determines the time constant to be "10" (the fastest response speed) as shown in the time constant map of FIG. 8.

Thus, during the operation stop, the response speed is made fast assuming that the time constant Tau is Tau0, and the steady-state value TH0 is determined on the basis of the saturation temperature THsatu of the refrigerant obtained from the radiator pressure PCI, or the average value of the refrigerant inlet temperature TCIin and refrigerant outlet temperature TCI of the radiator 4, thereby making it possible to smoothly resume control using the heating temperature TH when the operation is next started.

Embodiment 2

Figure 10:
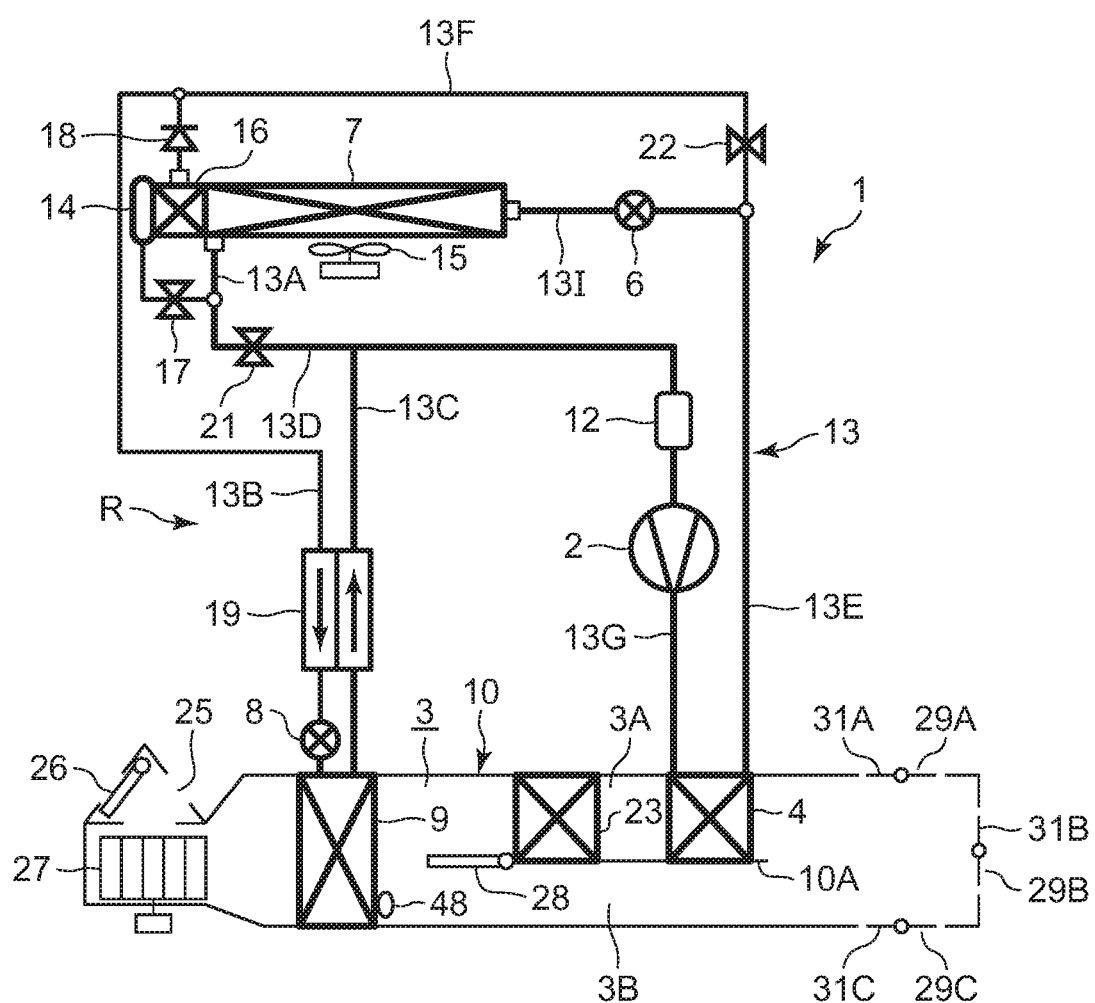
FIG. 10 is a constitutional view of a vehicular air conditioning device of another embodiment of the present invention (embodiment 2).

Next, FIG. 10 shows a constitutional view of a vehicular air conditioning device 1 of another embodiment to which the present invention is applied. Incidentally, in this drawing, components denoted at the same reference numerals as those in FIG. 1 have the same or similar function. In the case of the present embodiment, an outlet of a subcooling portion 16 is connected to a check valve 18. An outlet of the check valve 18 is connected to a refrigerant pipe 13B. Incidentally, the check valve 18 has a refrigerant pipe 13B (an indoor expansion valve 8) side which serves as a forward direction.

Further, a refrigerant pipe 13E on an outlet side of a radiator 4 branches before an outdoor expansion valve 6, and this branching refrigerant pipe (hereinafter called a second bypass pipe) 13F communicates and connects with a refrigerant pipe 13B on a downstream side of the check valve 18 via a solenoid valve 22 (for dehumidification). Then, the solenoid valve 22 is also connected to an output of a heat pump controller 32. Further, the bypass device 45 constituted of the bypass pipe 35, the solenoid valve 30 and the solenoid valve 40 in FIG. 1 of the aforementioned embodiment is not provided. Since others are similar to those in FIG. 1, their description will be omitted.

With the above constitution, an operation of the vehicular air conditioning device 1 of this embodiment will be described. In this embodiment, the heat pump controller 32 changes and executes respective operation modes of a heating mode, a dehumidifying and heating mode, an internal cycle mode, a dehumidifying and cooling mode, a cooling mode, and an auxiliary heater single mode (a MAX cooling mode does not exist in this embodiment). Incidentally, since operations and a flow of a refrigerant when the heating mode, the dehumidifying and cooling mode, and the cooling mode are selected, and the auxiliary heater single mode are similar to those in the above-described embodiment (embodiment 1), their description will be omitted. However, in the present embodiment (embodiment 2), the solenoid valve 22 is assumed to be closed in these heating mode, dehumidifying and cooling mode and cooling mode.

(12) Dehumidifying and Heating Mode of Vehicular Air Conditioning Device 1 in FIG. 10

On the other hand, when the dehumidifying and heating mode is selected, the heat pump controller 32 opens a solenoid valve 21 (for the heating) and closes a solenoid valve 17 (for the cooling) in this embodiment (embodiment 2). Also, the heat pump controller 32 opens the solenoid valve 22 (for the dehumidification). Then, the heat pump controller 32 operates a compressor 2. An air conditioning controller 20 operates respective blowers 15 and 27, and an air mix damper 28 basically has a state of passing all the air in an air flow passage 3, which is blown out from the indoor blower 27 and then flows via a heat absorber 9, through an auxiliary heater 23 and a radiator 4 in a heating heat exchange passage 3A, but performs an air volume adjustment as well.

Consequently, a high-temperature high-pressure gas refrigerant discharged from the compressor 2 flows from a refrigerant pipe 13G into the radiator 4. Since the air in the air flow passage 3 flowing into the heating heat exchange passage 3A passes through the radiator 4, the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4 and then reaches the outdoor expansion valve 6 through the refrigerant pipe 13E. The refrigerant flowing into the outdoor expansion valve 6 is decompressed therein, and then flows into an outdoor heat exchanger 7. The refrigerant flowing into the outdoor heat exchanger 7 evaporates, and the heat is pumped up from the outdoor air passed by running or the outdoor blower 15. In other words, a refrigerant circuit R functions as a heat pump. Then, a circulation is repeated in which the low-temperature refrigerant flowing out from the outdoor heat exchanger 7 flows via a refrigerant pipe 13A, the solenoid valve 21, and a refrigerant pipe 13D from a refrigerant pipe 13C into an accumulator 12, where it is subjected to gas-liquid separation, and then the gas refrigerant is sucked into the compressor 2.

Further, a part of the condensed refrigerant flowing to the refrigerant pipe 13E through the radiator 4 is distributed and flows through the solenoid valve 22 to reach from the second bypass pipe 13F and the refrigerant pipe 13B to the indoor expansion valve 8 through an internal heat exchanger 19. The refrigerant is decompressed by the indoor expansion valve 8 and then flows into the heat absorber 9 to evaporate. The water in the air blown out from the indoor blower 27 coagulates to adhere to the heat absorber 9 by a heat absorbing operation at this time, and hence, the air is cooled and dehumidified.

A circulation is repeated in which the refrigerant evaporated in the heat absorber 9 joins the refrigerant from the refrigerant pipe 13D at the refrigerant pipe 13C through the internal heat exchanger 19, and is then sucked into the compressor 2 through the accumulator 12. The air dehumidified in the heat absorber 9 is reheated in the process of passing through the radiator 4, and hence the dehumidifying and heating of the vehicle interior are performed.

The air conditioning controller 20 transmits a target heater temperature TCO (a target value of a radiator outlet temperature TCI) calculated from a target outlet temperature TAO to the heat pump controller 32. The heat pump controller 32 calculates a target radiator pressure PCO (a target value of a radiator pressure PCI) from the target heater temperature TCO, and controls the number of revolutions NC of the compressor 2 on the basis of the target radiator pressure PCO and the refrigerant pressure (a radiator pressure PCI, which is a high pressure of a refrigerant circuit R) of the radiator 4 which is detected by a radiator pressure sensor 47 to control heating by the radiator 4. Further, the heat pump controller 32 controls a valve position of the outdoor expansion valve 6 on the basis of a temperature Te of the heat absorber 9 detected by a heat absorber temperature sensor 48, and a target heat absorber temperature TEO transmitted from the air conditioning controller 20.

(13) Internal Cycle Mode of Vehicular Air Conditioning Device 1 of FIG. 10

Further, in the internal cycle mode, the heat pump controller 32 fully closes the outdoor expansion valve 6 in a state of the above dehumidifying and heating mode (fully opened position) and closes the solenoid valve 21. With the closure of the outdoor expansion valve 6 and the solenoid valve 21, the inflow of the refrigerant into the outdoor heat exchanger 7, and the outflow of the refrigerant from the outdoor heat exchanger 7 are prevented, and hence the condensed refrigerant flowing into the refrigerant pipe 13E through the radiator 4 all flows into the second bypass pipe 13F through the solenoid valve 22. Then, the refrigerant flowing through the second bypass pipe 13F reaches from the refrigerant pipe 13B to the indoor expansion valve 8 through the internal heat exchanger 19. The refrigerant is decompressed by the indoor expansion valve 8 and then flows into the heat absorber 9 to evaporate. The water in the air blown out from the indoor blower 27 coagulates to adhere to the heat absorber 9 by a heat absorbing operation at this time, and hence, the air is cooled and dehumidified.

A circulation is repeated in which the refrigerant evaporated in the heat absorber 9 flows into the refrigerant pipe 13C through the internal heat exchanger 19 and is sucked into the compressor 2 through the accumulator 12. The air dehumidified in the heat absorber 9 is reheated in the process of passing through the radiator 4, and hence the dehumidifying and heating of the vehicle interior are performed. Since, however, the refrigerant is circulated between the radiator 4 (heat radiation) and the heat absorber 9 (heat absorption) lying in the air flow passage 3 on the indoor side in the internal cycle mode, the pumping up of heat from the outdoor air is not performed, and a heating capability corresponding to power consumption of the compressor 2 is exhibited. Since the whole amount of the refrigerant flows through the heat absorber 9 which exhibits a dehumidifying operation, a dehumidifying capability is high as compared with the above dehumidifying and heating mode, but the heating capability becomes low.

The air conditioning controller 20 transmits the target heater temperature TCO (the target value of the radiator outlet temperature TCI) calculated from the target outlet temperature TAO to the heat pump controller 32. The heat pump controller 32 calculates a target radiator pressure PCO (a target value of a radiator pressure PCI) from the transmitted target heater temperature TCO, and controls the number of revolutions NC of the compressor 2 on the basis of the target radiator pressure PCO and the refrigerant pressure (the radiator pressure PCI, which is the high pressure of the refrigerant circuit R) of the radiator 4 which is detected by the radiator pressure sensor 47 to control heating by the radiator 4.

(14) Estimation of Heating Temperature TH by Operation Mode in Embodiment of FIG. 10

Then, even in the present embodiment, a heating temperature TH that is a temperature of the air on the leeward side of the radiator 4 is calculated by the aforementioned estimation formula (II). Then, the heating temperature TH is utilized for the calculation of the air volume ratio SW at which the air is passed through the radiator 4, and the changing of each operation mode in the air conditioning controller 20, but similarly even in the present embodiment, the heat pump controller 32 calculates the heating temperature TH using an estimation formula that differs depending on the operation mode.

Incidentally, in the auxiliary heater single mode or when the compressor 2 and the auxiliary heater 23 are stopped, the heating temperature TH is calculated in a manner similar to the aforementioned (11-1) case. Also, even upon the start of the transition from the dehumidifying and heating mode to the heating mode or during the startup of the compressor 2, the heating temperature TH is calculated as with the aforementioned (11-2) case. Further, even in the heating mode, the heating temperature TH is calculated as with the aforementioned (11-3) case. Additionally, even in the dehumidifying and cooling mode, the heating temperature TH is calculated as with the aforementioned (11-6) case. Furthermore, even in the cooling mode, the heating temperature TH is calculated as with the aforementioned (11-7) case.

(14-1) Calculation of Heating Temperature TH in Dehumidifying and Heating Mode, Internal Cycle Mode and During Operation Stop In the dehumidifying and heating mode and the internal cycle mode in the present embodiment, and when the vehicular air conditioning device 1 stops in operation (system stop), the heat pump controller 32 determines the aforementioned time constant Tau to be the time constant Tau0. Further, the heat pump controller 32 determines the aforementioned steady-state value TH0 to be the saturation temperature THsatu of the refrigerant obtained from the radiator pressure PCI (the refrigerant pressure of the radiator 4)+the predetermined offset value. Incidentally, even in this case, the heat pump controller 32 does not change the time constant Tau0 even if the above-described volumetric air volume Ga changes, and in the embodiment, the heat pump controller 32 determines the time constant to be "10" (the fastest response speed) as shown in the time constant map of FIG. 8.

Thus, in the dehumidifying and heating mode and the internal cycle mode, and during the operation stop in the present embodiment, the response speed is made fast assuming that the time constant Tau is Tau0, thereby making it possible to match the heating temperature TH with an actual change in the temperature of the air on the leeward side of the radiator 4. Also, even in the dehumidifying and heating mode and the internal cycle mode in this case, the steady-state value TH0 is determined on the basis of the saturation temperature THsatu being the average temperature of the radiator 4 having considered the subcool degree SC of the refrigerant in the radiator 4, thereby making it possible to appropriately estimate the heating temperature TH. Further, the same manner is applied even during the operation stop, and hence control using the heating temperature TH can be smoothly resumed when the operation is next started.

Incidentally, the numerical values and the like shown in each embodiment are not limited thereto and should be set as appropriate depending on a device to be applied. Further, the auxiliary heating device is not limited to the auxiliary heater 23 shown in the embodiment, but may utilize a heating medium circulating circuit of circulating a heating medium heated by a heater to heat air in the air flow passage 3, a heater core of circulating radiator water heated by an engine, etc.

DESCRIPTION OF REFERENCE NUMERALS 1 vehicular air conditioning device
2 compressor
3 air flow passage
4 radiator
6 outdoor expansion valve
7 outdoor heat exchanger
8 indoor expansion valve
9 heat absorber
10 HVAC unit
11 control device 20 air conditioning controller
23 auxiliary heater (auxiliary heating device)
27 indoor blower (blower fan)
28 air mix damper
32 heat pump controller
65 vehicle communication bus.
R refrigerant circuit

The invention claimed is:

1. A vehicular air conditioning device comprising:
a compressor to compress a refrigerant;
an air flow passage through which air to be supplied to a vehicle interior flows;
a radiator to let the refrigerant radiate heat, thereby heating the air to be supplied from the air flow passage to the vehicle interior;
a heat absorber to let the refrigerant absorb heat, thereby cooling the air to be supplied from the air flow passage to the vehicle interior; and
a control device,
whereby the control device changes and executes a plurality of operation modes to condition the air of the vehicle interior,
wherein the control device calculates a heating temperature TH being a temperature of the air on a leeward side of the radiator and uses the heating temperature TH in control, and calculates the heating temperature TH using an estimation formula which differs depending on an operation mode,
wherein the control device performs a calculation of a first-order lag of a time constant Tau different depending on the operation mode to calculate the heating temperature TH.

2. The vehicular air conditioning device according to claim 1, wherein the control device uses the heating temperature TH for calculation of an air volume ratio SW at which the air is to be passed through the radiator, and/or for changing of the operation modes.

3. The vehicular air conditioning device according to claim 1, wherein the control device changes the time constant Tau of the first-order lag according to a volumetric air volume Ga of the air flowing into the air flow passage.

4. The vehicular air conditioning device according to claim 1, wherein the control device calculates the heating temperature TH on the basis of a steady-state value TH0 being a value of the heating temperature TH in a steady state, and the time constant Tau of the first-order lag.

5. The vehicular air conditioning device according to claim 4, comprising:
an outdoor heat exchanger provided outside the vehicle interior,
wherein the control device has a dehumidifying and cooling mode to let the refrigerant discharged from the compressor flow from the radiator to the outdoor heat exchanger, let the refrigerant radiate heat in the radiator and the outdoor heat exchanger, decompress the refrigerant heat-radiated, and then let the refrigerant absorb heat in the heat absorber, and
wherein in the dehumidifying and cooling mode, the control device determines the steady-state value TH0 on the basis of a saturation temperature THsatu of the refrigerant obtained from a refrigerant pressure of the radiator.

6. The vehicular air conditioning device according to claim 4, comprising:
an outdoor heat exchanger provided outside the vehicle interior,
wherein the control device has a cooling mode to let the refrigerant discharged from the compressor flow from the radiator to the outdoor heat exchanger, let the refrigerant radiate heat in the outdoor heat exchanger, decompress the refrigerant heat-radiated, and then let the refrigerant absorb heat in the heat absorber, and
wherein in the cooling mode, the control device determines the steady-state value TH0 on the basis of an average value of refrigerant temperatures of an inlet and an outlet of the radiator.

7. The vehicular air conditioning device according to claim 4, comprising:
a bypass device to let the refrigerant discharged from the compressor flow directly into the outdoor heat exchanger without flowing to the radiator,
wherein the control device has a maximum cooling mode to let the refrigerant discharged from the compressor flow into the outdoor heat exchanger by the bypass device and radiate heat therein, decompress the refrigerant heat-radiated, and then let the refrigerant absorb heat in the heat absorber, and
wherein in the maximum cooling mode, the control device determines the steady-state value TH0 on the basis of the average value of the refrigerant temperatures of the inlet and outlet of the radiator.

8. The vehicular air conditioning device according to claim 4, wherein the control device has a heating mode to let the refrigerant discharged from the compressor flow into the radiator and radiate heat therein, decompress the refrigerant heat-radiated, and then let the refrigerant absorb heat in the outdoor heat exchanger,
wherein in the heating mode, the control device corrects the saturation temperature THsatu of the refrigerant obtained from the refrigerant pressure of the radiator with a predetermined correction value to determine the steady-stage value TH0, and
wherein the control device determines the correction value from a subcool degree SC of the refrigerant in the radiator and the volumetric air volume Ga of the air flowing into the air flow passage, or the volumetric air volume Ga and an air volume ratio SW at which the air is to be passed through the radiator.

9. The vehicular air conditioning device according to claim 4, comprising:
a bypass device to let the refrigerant discharged from the compressor flow directly into the outdoor heat exchanger without flowing to the radiator; and
an auxiliary heating device to let the air to be supplied from the air flow passage to the vehicle interior heat,
wherein the control device executes a dehumidifying and heating mode to let the refrigerant discharged from the compressor flow into the outdoor heat exchanger by the bypass device and radiate heat therein, decompress the refrigerant heat-radiated, then let the refrigerant absorb heat in the heat absorber, and let the auxiliary heating device generate heat, and
wherein in the dehumidifying and heating mode, the control device determines the steady-state value TH0 on the basis of a temperature Tptc of the auxiliary heating device.

10. The vehicular air conditioning device according to claim 4, wherein the control device has a dehumidifying and heating mode to let the refrigerant discharged from the compressor radiate heat in the radiator, decompress the refrigerant head-radiated, and then let the refrigerant absorb heat only in the heat absorber, or in the heat absorber and the outdoor heat exchanger, and wherein in the dehumidifying and heating mode, the control device determines the steady-state value TH0 on the basis of the saturation temperature THsatu of the refrigerant obtained from the refrigerant pressure of the radiator.

11. The vehicular air conditioning device according to claim 4, wherein the control device determines the steady-stage value TH0 on the basis of the saturation temperature THsatu of the refrigerant obtained from the refrigerant pressure of the radiator, or the average value of the refrigerant temperatures of the inlet and outlet of the radiator during an operation stop.

12. The vehicular air conditioning device according to claim 3, wherein the control device calculates the heating temperature TH on the basis of a steady-state value TH0 being a value of the heating temperature TH in a steady state, and the time constant Tau of the first-order lag.

13. The vehicular air conditioning device according to claim 5, comprising:
an outdoor heat exchanger provided outside the vehicle interior,
wherein the control device has a cooling mode to let the refrigerant discharged from the compressor flow from the radiator to the outdoor heat exchanger, let the refrigerant radiate heat in the outdoor heat exchanger, decompress the refrigerant heat-radiated, and then let the refrigerant absorb heat in the heat absorber, and
wherein in the cooling mode, the control device determines the steady-state value TH0 on the basis of an average value of refrigerant temperatures of an inlet and an outlet of the radiator.

14. The vehicular air conditioning device according to claim 6, further comprising:
a bypass device to let the refrigerant discharged from the compressor flow directly into the outdoor heat exchanger without flowing to the radiator,
wherein the control device has a maximum cooling mode to let the refrigerant discharged from the compressor flow into the outdoor heat exchanger by the bypass device and radiate heat therein, decompress the refrigerant heat-radiated, and then let the refrigerant absorb heat in the heat absorber, and
wherein in the maximum cooling mode, the control device determines the steady-state value TH0 on the basis of the average value of the refrigerant temperatures of the inlet and outlet of the radiator.

15. The vehicular air conditioning device according to claim 7, wherein the control device has a heating mode to let the refrigerant discharged from the compressor flow into the radiator and radiate heat therein, decompress the refrigerant heat-radiated, and then let the refrigerant absorb heat in the outdoor heat exchanger,
wherein in the heating mode, the control device corrects the saturation temperature THsatu of the refrigerant obtained from the refrigerant pressure of the radiator with a predetermined correction value to determine the steady-stage value TH0, and
wherein the control device determines the correction value from a subcool degree SC of the refrigerant in the radiator and the volumetric air volume Ga of the air flowing into the air flow passage, or the volumetric air volume Ga and an air volume ratio SW at which the air is to be passed through the radiator.

16. The vehicular air conditioning device according to claim 8, comprising:
a bypass device to let the refrigerant discharged from the compressor flow directly into the outdoor heat exchanger without flowing to the radiator; and
an auxiliary heating device to let the air to be supplied from the air flow passage to the vehicle interior heat,
wherein the control device executes a dehumidifying and heating mode to let the refrigerant discharged from the compressor flow into the outdoor heat exchanger by the bypass device and radiate heat therein, decompress the refrigerant heat-radiated, then let the refrigerant absorb heat in the heat absorber, and let the auxiliary heating device generate heat, and
wherein in the dehumidifying and heating mode, the control device determines the steady-state value TH0 on the basis of a temperature Tptc of the auxiliary heating device.

17. The vehicular air conditioning device according to claim 8, wherein the control device has a dehumidifying and heating mode to let the refrigerant discharged from the compressor radiate heat in the radiator, decompress the refrigerant head-radiated, and then let the refrigerant absorb heat only in the heat absorber, or in the heat absorber and the outdoor heat exchanger, and
wherein in the dehumidifying and heating mode, the control device determines the steady-state value TH0 on the basis of the saturation temperature THsatu of the refrigerant obtained from the refrigerant pressure of the radiator.

18. The vehicular air conditioning device according to claim 10, wherein the control device determines the steady-stage value TH0 on the basis of the saturation temperature THsatu of the refrigerant obtained from the refrigerant pressure of the radiator, or the average value of the refrigerant temperatures of the inlet and outlet of the radiator during an operation stop.

* * * * *